United States Patent [19]

Kawamoto et al.

[11] Patent Number: 5,585,229
[45] Date of Patent: Dec. 17, 1996

[54] HEAT TREATMENT METHOD OF PHOTOGRAPHIC POLYESTER SUPPORT

[75] Inventors: Fumio Kawamoto; Takashi Sakai; Daisuke Fujikura, all of Kanagawa, Japan

[73] Assignee: Fuji Photo Film Co., Ltd., Kanagawa, Japan

[21] Appl. No.: 394,259

[22] Filed: Feb. 24, 1995

[30]     Foreign Application Priority Data

Feb. 25, 1994  [JP]  Japan ..................................... 6-028530

[51] Int. Cl.⁶ .................................................. G03C 1/795
[52] U.S. Cl. ........................... 430/533; 264/234; 264/235; 264/345; 264/346; 264/347
[58] Field of Search .................................. 264/234, 235, 264/345, 346, 347; 430/533

[56]                References Cited

U.S. PATENT DOCUMENTS

| | | | |
|---|---|---|---|
| 3,504,075 | 3/1970 | Williams, Jr. et al. | 264/175 |
| 4,140,740 | 2/1979 | De Smedt et al. | 264/146 |
| 4,141,735 | 2/1979 | Schrader et al. | 96/75 |
| 5,308,010 | 5/1994 | Hakiel | 242/75.3 |

FOREIGN PATENT DOCUMENTS

| | | |
|---|---|---|
| 0506309 | 9/1992 | European Pat. Off. . |
| 1005829 | 1/1989 | Japan . |
| 519452 | 3/1993 | Japan . |

*Primary Examiner*—Hoa Van Le
*Attorney, Agent, or Firm*—Sughrue, Mion, Zinn, Macpeak & Seas

[57]                  ABSTRACT

A method for heat treating a rolled polyester support at a temperature lower than the glass transition temperature (Tg) is disclosed, wherein the polyester film is wound around a core to have a difference in roll diameter of 10% or less and then heat treated to render the film surface smooth. Further disclosed are a photographic polyester support which is subjected to heat treatment according to the above-described method, a silver halide photographic material which uses the above-described polyester support and a polyester support having a creak value of from 10 to 600 g.

12 Claims, 1 Drawing Sheet

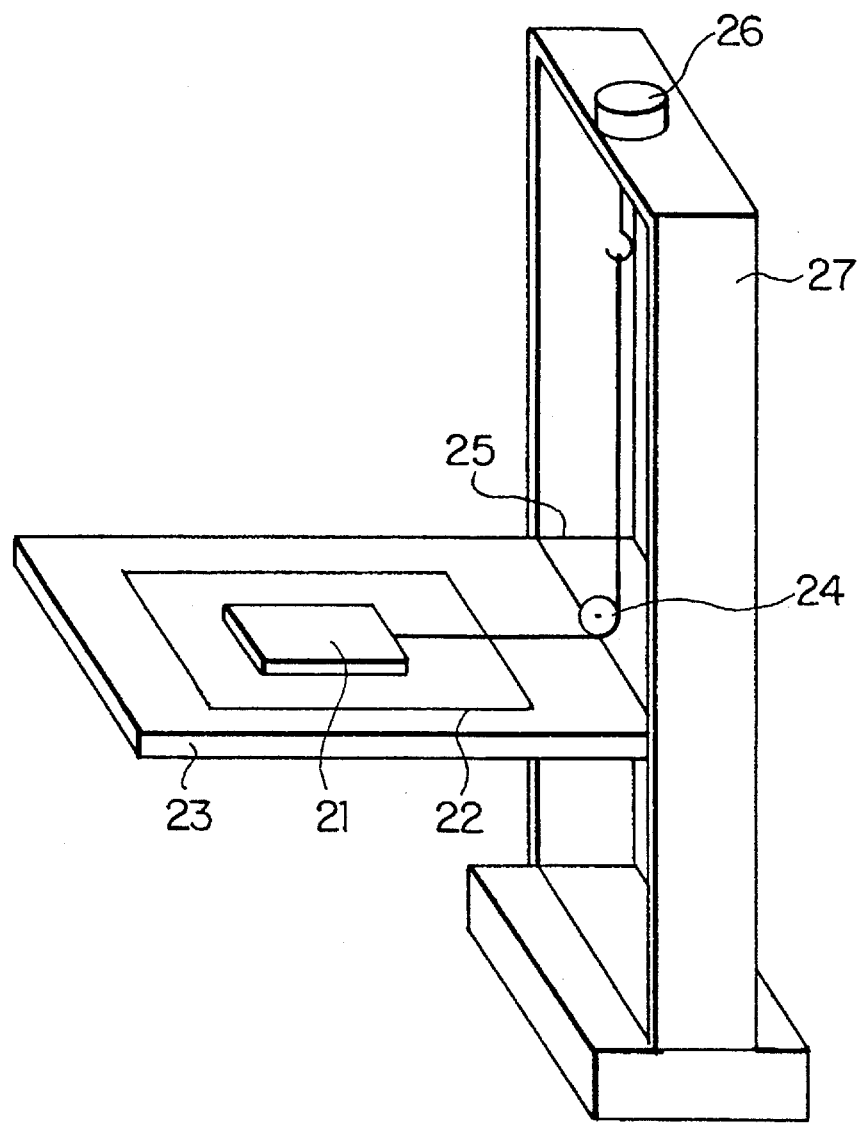
FIGURE

HEAT TREATMENT METHOD OF PHOTOGRAPHIC POLYESTER SUPPORT

FIELD OF THE INVENTION

The present invention relates to a photographic polyester support having excellent planeness.

BACKGROUND OF THE INVENTION

In order to improve the planeness of a rolled polyester, U.S. Pat. No. 4,140,740 proposes to set the winding tension at 100 Kp/sq.cm or more. A heat treatment method where the air amount intervening in the roll is prescribed is also known as described in JP-A-64-5825 (the term "JP-A" as used herein means an "unexamined published Japanese patent application").

On the other hand, although the polyester support has good mechanical strength and is suitable for the thinning, it suffers from such a defect as that the curling habit is not released.

In order to overcome such a defect, U.S. Pat. No. 4,141,735 describes a method where a polyester-based polymer is heat treated at a temperature (hereinafter referred to as "BTA" meaning "below Tg annealing") lower than the glass transition temperature (hereinafter referred to as "Tg") to become difficult to have a curling habit.

When it is subjected to heat treatment in a roll form, the equipment required for the heat treatment is only a thermostatic bath and such a heat treatment method is advantageous in view of industrial point, however, the planeness is conspicuously lowered due to the deformation of film accompanying shrinkage and expansion generated during heat treatment. For example, wavy unevenness may be caused at a cycle of several tens cm in the widthwise direction or recessions in a diameter of about several cm may be generated periodically.

Accordingly, the polyester support cannot be used as a photographic support which is required to have higher planeness.

SUMMARY OF THE INVENTION

An object of the present invention is, accordingly, to provide a heat treatment method where good planeness can be maintained after the heat treatment.

Another object of the present invention is to provide a photographic polyester support subjected to the above-described heat treatment.

The above-described objects have been achieved by a heat treatment method of a polyester support comprising heat treating a rolled polyester support at a temperature lower than the glass transition temperature (Tg), wherein the polyester film is wound around a core to have a difference in roll diameter of 10% or less and then heat treated to render the film surface smooth.

DETAILED DESCRIPTION OF THE INVENTION

The difference in roll diameter before heat treatment is preferably from 0 to 10%, more preferably from 0 to 8%, still more preferably from 0 to 5%.

The difference (%) in roll diameter is obtained by measuring the length between the core surface and the outermost circumference of the roll at four points on the top and the bottom in both edges of the roll and determined according to the following equation:

$$\text{Difference (\%) in roll diameter} = \{(L_1-L_2)/(L_1+L_2)\} \times 100$$

where $L_1$ represents the maximum length and $L_2$ represents the minimum length.

The large difference in roll diameter indicates that the roll is not wound evenly but wound loosely with the space between bases at one side being larger. As a result, the stress generated during heat treatment is apt to concentrate on one side and the planeness is prone to be lowered. The difference in roll diameter may be large between both edges of the roll (horizontal difference in roll diameter) or between the top and the bottom of the roll (vertical difference in roll diameter).

In order to wind up the roll evenly with the difference in roll diameter being reduced, it is effective to render the thickness of knurls (formed by knurling, which is extruding, applied longitudinally to the edge portion of the base) uniform on both edges and in the length direction. The knurl can be provided by passing the edge of the support between a pair of upper and lower rollers (dies) imparted with irregularities pressed by the force of springs. This procedure is applied to both edges of the support and when the difference in pressure of dies pressed on both edges is set to fall within 10%, preferably 8%, more preferably 5%, the horizontal difference in roll diameter can be made small. Further, the knurling is preferably carried out while heating the support and/or the die and when the difference in temperature between both edges and the fluctuation in temperature per a unit time are controlled to fall within 10%, preferably 8%, more preferably 5%, the vertical and horizontal difference in roll diameter can be made small.

Also, in realizing such a difference in roll diameter, the uniformity of tension in the width direction on winding is one of important factors. When the tension at both edges of the support is controlled to fall within 10%, preferably 8%, more preferably 5%, the horizontal difference in roll diameter can be made small and thereby the heat treatment favored with good planeness can be achieved. Also, the vertical difference in roll diameter can be made small when the winding tension is set at preferably from 2 to 75 g/m, more preferably from 3 to 40 kg/m, still more preferably from 4 to 25 kg/m. Namely, if the winding tension is lower than this range, the roll after taking up is readily sagged and the vertical difference in roll diameter is apt to be large. On the other hand, if the winding tension exceeds this range, the support is disadvantageously prone to stick with each other during heat treatment. In the above-described taking up, it is more effective for the purpose of reducing the vertical difference in roll diameter to set the tension close to the core high and gradually diminish the tension toward the exterior. The tension ratio between the exterior and the core is preferably from 0.1 to 0.9, more preferably from 0.2 to 0.8, still more preferably from 0.3 to 0.7.

The present inventors have found that in producing films in an industrial scale, the weight of film by itself due to the gravitation when wound around the core has an influence which cannot be neglected and the conditions in the production process such as the difference in roll diameter must be strictly controlled as described above. In this case, slight space must be present between films.

The air layer (space) has a thickness of preferably from 1.5 to 10 μm, more preferably from 2 to 8 μm, still more preferably from 2.5 to 5 μm.

To ensure the space, the both edges of the support is preferably knurled. Namely, by lifting the support from the support coming around adjacent thereto with knurls, an appropriate air layer is formed and at the same time, by engaging irregularities on the knurl portion, the slippage between supports can be prevented.

The knurling can be carried out by the above-described method using a pair of upper and lower rollers (dies) imparted with irregularities. The height of knurl is preferably from 1 to 50 μm, more preferably from 2 to 30 μm, still more preferably from 3 to 25 μm. The width of knurl is preferably from 2 to 50 mm, more preferably from 5 to 30 mm, still more preferably 7 to 20 mm. The knurling may be either single extrusion or double extrusion. The knurling is also preferably carried out at a temperature higher than the Tg.

The core is preferably a "core with protrusion" where the portion coming into contact with knurls is traversed by from 0.1 to 30 mm, preferably from 0.1 to 10 mm, more preferably from 0.2 to 3 mm. By doing so, the winding is carried out while lifting the support other than the knurled portion and accordingly, the winding tension is easily concentrated on the knurled portion. As a result, the winding can be effected more tightly and the difference in roll diameter can be reduced. On the other hand, if the knurls and/or "core with protrusion" are not used, the difference in roll diameter cannot be reduced unless a great tension is applied to the entire surface of the support but if applied the great tension, in return, the slipperiness between supports is lowered and the stress generated during heat treatment cannot be released. Accordingly, the support cannot have high planeness.

The thickness of the air layer between supports in the roll form can also be controlled by selecting the taking-up conditions. One of the most important conditions is the winding tension and it is preferably from 3 to 75 kg/m, more preferably from 3 to 40 kg/m, still more preferably from 4 to 25 kg/m.

The thickness of the air layer can also be controlled by the winding speed. The winding speed is preferably from 5 to 150 m/min., more preferably from 10 to 100 m/min., still more preferably from 20 to 80 m/min.

The core wound around by the support has a diameter of from 100 to 1,500 mm, preferably from 150 to 1,000 mm, more preferably from 200 to 800 mm.

The material for the core is not particularly restricted but preferably free from reduction in strength due to heat or heat deformation, and examples thereof include stainless steel, aluminum or glass fiber-reinforced resin. The core may also be lined with rubber or resin, if desired. Also, the roll core may have a hollow for increasing the efficiency in propagation of heat to the film or a structure such that an electric heater is included therein or a high temperature liquid can flow so as to effect heating.

The environment in winding may be at any temperature between room temperature and the Tg of the support.

The present invention can also be achieved by controlling the difference in roll diameter and the creak value. The creak value of the support is preferably from 10 to 600 g, more preferably from 50 to 400 g, still more preferably from 100 to 250 g. The creak value is a force required to pull the support of which front surface is put in contact with the back surface thereof under a constant load and at a constant rate. In other words, the creak value indicates the slipperiness between the front surface and the back surface of the support.

In the present invention, the creak value is controlled by applying fine particles onto the font surface.

The fine particle used may be normal organic or inorganic fine particles.

Examples of the inorganic fine particle include particles of an oxide, a hydroxide, a sulfide, a nitride, a halide, a carbonate, an acetate, a phosphate, a phosphite, an organic carboxylate, a silicate, a titanate and a borate of elements belonging to Group IA, Group IIA, Group IVA, Group VIA, Group VIIA, Group VIIIA, Group IB, Group IIB, Group IIIB and Group IVB, a hydrate compound thereof, a composite compound mainly composed thereof, and natural mineral. Specific examples thereof include particles of compounds of Group IA element such as lithium fluoride and borax (sodium borate hydrate salt), compounds of Group IIA element such as magnesium carbonate, magnesium phosphate, magnesium oxide (magnesia), magnesium chloride, magnesium acetate, magnesium fluoride, magnesium titanate, magnesium silicate, magnesium silicate hydrate salt (talc), calcium carbonate, calcium phosphate, calcium phosphite, calcium sulfate (gypsum), calcium acetate, calcium terephthalate, calcium hydroxide, calcium silicate, calcium fluoride, calcium titanate, strontium titanate, barium carbonate, barium phosphate, barium sulfate and barium phosphite, compounds of Group IVA element such as titanium dioxide (titania), titanium monoxide, titanium nitride, zirconium dioxide (zirconia) and zirconium monoxide, compounds of Group VIA element such as molybdenum dioxide, molybdenum trioxide and molybdenum sulfide, compounds of VIIA element such as manganese chloride and manganese acetate, compounds of Group VIII element such as cobalt chloride and cobalt acetate, compounds of Group IB element such as cuprous iodide, compounds of Group IIB element such as zinc oxide and zinc acetate, compounds of Group IIIB elements such as aluminum oxide (alumina), aluminum oxide, aluminum fluoride, aluminosilicate (alumina silicate, kaolin, kaolinite), compounds of Group IVB element such as silicon oxide (silica, silica gel), plumbago, carbon, graphite and glass and natural minerals such as carnallite, kainite, mica (mica, phlogopite) and pyrolusite.

The organic fine particle is preferably a polymer compound having a glass transition temperature of 50° C. or higher, preferably 60° C. or higher, more preferably 65° C. or higher.

Specific examples of the polymer compound constituting the organic fine particle include polytetrafluoroethylene, cellulose acetate, polystyrene, polymethyl methacrylate, polypropyl methacrylate, polymethyl acrylate, polyethylene carbonate, starch and pulverized and classified products thereof.

Also, polymer compounds synthesized by suspension polymerization, polymer compounds rendered spherical by spray drying or dispersion or inorganic compounds may be used.

Further, a polymer compound as a polymer of one or more monomer compounds may be formed into particles by various means. Preferred examples thereof include acrylic esters, methacrylic esters, vinyl esters, styrenes and olefins.

Particles having a fluorine atom or a silicon atom may also be used in the present invention.

Among these, preferred examples of the particle composition include polystyrene, polymethyl (meth)acrylate, polyethyl acrylate, poly(methyl methacrylate/methacrylic acid= 95/5 (molar ratio)), poly(styrene/styrene sulfonic acid=95/5 (molar ratio)), polyacrylonitrile, poly(methyl methacrylate/ ethyl acrylate/methacrylic acid=50/40/10)) and silica.

The above-described organic or inorganic fine particles are more preferably electrically conductive fine particles. The effect thereof is particularly outstanding when a surface-treated support is heat treated.

Further, before the above-described heat treatment, it is preferred to provide an electroconductive layer on at least one surface of the support.

The above-described electroconductive layer is preferably applied to have a resistance of from $10^3$ to $10^{12}$ Ω, more preferably from $10^4$ to $10^{11}$ Ω, still more preferably from $10^5$ to $10^{10}$ Ω.

Most preferred examples of the electrically conductive inorganic particle include fine particles of at least one crystalline metal oxide selected from $ZnO$, $TiO_2$, $SnO_2$, $Al_2O_3$, $In_2O_3$, $SiO_2$, $MgO$, $BaO$, $MoO_3$ and $V_2O_5$ and of a composite oxide of these. Among these, particularly preferred is an electrically conductive material comprising $SnO_2$ as a main component, approximately from about 5 to 20% of antimony oxide and/or other ingredients (e.g., silicon oxide, boron, phosphorus). The fine particle of the metal oxide or a composite oxide thereof has a volume resistivity of from 0 to $10^7$ Ω/cm, preferably $10^6$ Ω/cm or less, more preferably $10^5$ Ω/cm.

An ionic electrically conductive polymer or latex may also be used. There is no particular restriction on the ionic electrically conductive polymer used and any of anionic, cationic, betaine and nonionic polymers may be used, with the anionic and cationic electrically conductive polymers being preferred among these. More preferred are anionic sulfonic acid-based, anionic carboxylic acid-based and anionic phosphoric acid-based polymers or latexes and tertiary amine-based, quaternary ammonium-based and phosphonium-based polymers.

These organic/inorganic and electrically conductive/electrically non-conductive fine particles may be used as a mixture of two or more thereof. Among these fine particles, preferred are electrically conductive/electrically non-conductive inorganic fine particles and electrically conductive organic particles and more preferred are electrically conductive inorganic fine particles.

With respect to the particle size, in the case where secondary particles are formed resulting from agglomeration of primary particles as seen in electrically conductive inorganic fine particles, the primary particle has a diameter of preferably from 0.0001 to 1 μm, more preferably from 0.001 to 0.5 μm, still more preferably from 0.001 to 0.3 μm. The secondary particle has a diameter of preferably from 0.01 to 5 μm, more preferably from 0.02 to 3 μm, still more preferably from 0.03 to 2 μm.

In the case of fine particles composed of simple particles, the size is preferably from 0.01 to 5 μm, more preferably from 0.02 to 3 μm, still more preferably from 0.03 to 2 μm.

The electrically non-conductive or electrically conductive organic/inorganic particles may be coated as a coating solution using no binder and in this case, the coating amount is preferably from 0.005 to 3 g/m², more preferably from 0.01 to 1.5 g/m², still more preferably from 0.02 to 1.0 g/m². Further, in this case, a binder is preferably coated thereon.

The electrically non-conductive or electrically conductive fine particles are more preferably coated together with a binder. In this case, the coating amount is preferably from 0.001 to 3 g/m², more preferably from 0.001 to 1.0 g/m², still more preferably from 0.005 to 0.5 g/m², most preferably from 0.01 to 0.3 g/m². The coating amount of the binder is preferably from 0.001 to 2 g/m², more preferably from 0.005 to 1 g/m², still more preferably from 0.01 to 0.5 g/m². The weight ratio of fine particles to the binder is preferably from 1,000/1 to 1/1,000, more preferably from 500/1 to 1/500, still more preferably from 250/1 to 1/250. These fine particles may be used as a combination of spherical particles and fibrous particles.

As the binder, a known thermoplastic resin, thermosetting resin, radiation-curable resin, reactive resin or a mixture thereof, or a hydrophilic binder such as gelatin may be used.

Examples of the above-described thermoplastic resin include cellulose derivatives such as cellulose triacetate, cellulose diacetate, cellulose acetate maleate, cellulose acetate phthalate, hydroxyacetyl cellulose phthalate, cellulose linear alkyl ester, nitrocellulose, cellulose acetate propionate and cellulose acetate butyrate resins, vinyl-based copolymers such as a vinyl chloride-vinyl acetate copolymer, a vinyl chloride, vinyl acetate-vinyl alcohol, maleic acid and/or acrylic acid copolymer, a vinyl chloride-vinylidene chloride copolymer, a vinyl chloride-acrylonitrile copolymer and an ethylene-vinyl acetate copolymer, rubber-based resins such as acrylic resin, polyvinyl acetal resin, polyvinyl butyral resin, polyester polyurethane resin, polyether polyurethane resin, polycarbonate polyurethane resin, polyester resin, polyether resin, polyamide resin, amino resin, styrene-butadiene resin and butadiene acrylonitrile resin, silicone-based resins and fluororesins.

As the radiation-curable resin, those containing a group having a carbon-carbon unsaturated bond as a radiation-curable functional group bonded to the above-described thermoplastic resin are used. Preferred examples of the functional group include an acryloyl group and a methacryloyl group.

A polar group may be incorporated into the binder.

The binder used may be a combination of several kinds of binders and may be hardened by adding thereto a known isocyanate-based crosslinking agent and/or radiation-curable vinyl monomer.

Examples of the hydrophilic binder include a water-soluble polymer, a cellulose ester and a latex polymer. Examples of the water-soluble polymer include gelatin, a gelatin derivative, casein, agar, sodium alginate, starch, polyvinyl alcohol, a polyacrylic acid copolymer and a maleic anhydride copolymer, examples of the cellulose eater include carboxymethyl cellulose and hydroxyethyl cellulose, and examples of the latex polymer include a vinyl chloride-containing copolymer, a vinylidene anhydride-containing copolymer, an acrylic ester-containing copolymer, a vinyl acetate-containing copolymer and a butadiene-containing copolymer. Among these, most preferred is gelatin. The gelatin may also be used in combination with a gelatin derivative.

The gelatin-containing layer can be hardened. Examples of the hardening agent include aldehyde-based compounds such as formaldehyde and glutaraldehyde, ketone compounds such as diacetyl and cyclopentanedion, compounds such as bis(2-chloroethylurea) and 2-hydroxy-4,6-dichloro-1,3,5-triazine or having other reactive halogens, compounds such as divinylsulfone and 5-acetyl-1,3-diacryloylhexahydro-1,3,5-triazine or having a reactive olefin, N-hydroxymethylphthalimide, N-methylol compounds, isocyanates, azilidine compounds, acid derivatives, epoxy compounds and halogenocarboxyaldehydes such as mucochloric acid. Or, examples of the hardening agent for the inorganic compound include chrome alum and zirconium sulfate. Also, a carboxyl group activation-type hardening agent may be used.

The coating of these may be carried out by a commonly well known method such as dip coating, air knife coating, curtain coating, roller coating, wire bar coating or gravure coating, or by extrusion coating using a hopper described in U.S. Pat. No. 2,681,294. If desired, two or more layers can be coated simultaneously according to the methods described in U.S. Pat. Nos. 2,761,791, 3,508,947, 2,941,898 and 3,526,528 and Yuji Harasaki, *Coating Kogaku*, published by Asakura Shoten, p. 253 (1973).

In the present invention, at least one surface of the support is preferably surface treated before heat treatment so as to obtain a firm adherence between the support and the light-sensitive layer.

The glow treatment is a method comprising effecting the treatment by transporting the support through electrodes placed in a vacuum. The vacuum degree in the glow treatment is preferably from 0.005 to 20 Torr, more preferably from 0.02 to 2 Torr. The voltage is preferably from 500 to 5,000 V, more preferably from 500 to 3,000 V.

The discharge frequency used is, as seen in conventional techniques, from d.c. to several thousands MHz, preferably from 50 Hz to 20 MHz, more preferably from 1 kHz to 1 MHz.

The discharge treatment strength is preferably from 0.01 to 5 KV.A.min/m$^2$, more preferably from 0.15 to 1 KV.A.min/m$^2$ to achieve desired adhesion performance.

The glow treatment used in the present invention can provide the most excellent adhesion effect particularly when steam is introduced into the atmosphere. This technique is also effective for preventing yellowing or self-adhesion of the support.

When the glow treatment is effected in the presence of steam, the steam partial pressure is preferably from 10% to 100%, more preferably from 40% to 90%. The remaining gas other than the steam is an air composed of oxygen, nitrogen and the like. The steam can be quantitatively introduced into the atmosphere of glow discharge treatment by introducing gas from a sampling tube installed to the glow discharge treatment apparatus into a tetrode-type mass spectrograph (MSQ-150, produced by Nippon Shinku K.K.) while quantitatively determining the composition.

With respect to the method for irradiating ultraviolet rays, in the case of a high-pressure mercury lamp having a main wavelength at 365 nm, the irradiation light quantity is from 20 to 10,000 mJ/cm$^2$, more preferably from 50 to 2,000 mJ/cm$^2$, whereas in the case of a low-pressure mercury lamp having a main wavelength at 254 nm, the irradiation light quantity is from 100 to 10,000 mJ/cm$^2$, more preferably from 200 to 1,500 mJ/cm$^2$.

The flame treatment is a method for effecting surface treatment while passing the support on flames produced by combusting an inflammable gas. The inflammable gas may be either a natural gas or a liquified propane gas, however, a mixing ratio thereof to air is of importance. In the case of propane gas, a preferred mixing ratio of propane gas/air is, in terms of volume ratio, from 1/14 to 1/22, preferably 1/16 to 1/19. In the case of natural gas, it is from 1/6 to 1/10, preferably from 1/7 to 1/9.

The flame treatment may be conducted at from 1 to 50 Kcal/m$^2$, more preferably from 3 to 30 Kcal/m$^2$. Further, it is more effective to set the distance between the top of inner flame of a burner and the support to less than 4 cm. The treating apparatus may be a flame treatment apparatus manufactured by Kasuga Denki K.K. The backup roller for holding the support at the flame treatment is preferably a hollow-type roller to effect the treatment all the time at a constant temperature while water-cooling the roller by passing cooling water through the hollow.

The corona treatment is a method for effecting surface treatment while passing the support through electrodes provided in an atmospheric pressure. The discharge frequency is suitably from 50 Hz to 5,000 kHz, preferably from 5 to 100 kHz. The treatment strength of the treated subject is suitably, in view of improvement in wettability of the normal polyester derivative, from 0.001 to 5 KV.A.min/m$^2$, preferably from 0.01 to 1 KV.A.min/m$^2$. The gap clearance between the electrode and the dielectric roller is from 0.5 to 2.5 mm, preferably from 1.0 to 2.0 mm.

For example, in the case where a solid state corona treatment machine, Model 6KVA manufactured by Pillar Co., Ltd., is used, the discharge frequency at the treatment is from 5 to 40 kHz, preferably from 10 to 30 kHz. The waveform is preferably a.c. sinusoidal wave. The gap clearance between the electrode and the dielectric roller is from 1 to 2 mm, preferably from 1.4 to 1.6 mm. The treating amount is from 0.3 to 0.4 KV.A.min/m$^2$, preferably from 0.34 to 0.38 KV.A.min/m$^2$.

The heat treatment of the present invention is conducted at a heat treatment temperature of from 50° C. to less than the Tg, preferably from 25° C. lower than the Tg (Tg −25° C.) to less than the Tg, more preferably from 15° C. lower than the Tg (Tg−15° C.) to less than the Tg.

In the case of PEN, it is from 50° C. to 119° C., preferably from 94° C. to 119° C., more preferably from 104° C. to 119° C.

The heat treatment time is from 0.1 to 1,500 hours, preferably from 2 to 1,000 hours, more preferably from 5 to 400 hours.

The heat treatment is preferably conducted before providing an undercoat layer (a subbing layer on the light-sensitive layer side). The undercoat layer usually comprises gelatin as a main component and therefore, the layer easily adheres on heating to cause self-adhesion during heat treatment. Accordingly, the heat treatment is preferably conducted between after heat treatment and before undercoating.

Among dicarboxylic acids which constitute the polyester support of the present invention, preferred aromatic dicarboxylic acids are naphthalenedicarboxylic acid (e.g., 2,6-, 1,5-, 1,4-, 2,7-), terephthalic acid (TPA), isophthalic acid (IPA), orthophthalic acid (OPA) and paraphenylenedicarboxylic acid (PPDC), with 2,6-naphthalenedicarboxylic acid (2,6-NDCA) being more preferred.

The naphthalenedicarboxylic acid content in the entire dicarboxylic acid residue is preferably 50 mol % or more, more preferably 70 mol % or more, still more preferably 80 mol % or more.

The polyester has a Tg of preferably from 90° C. to 200° C., more preferably from 95° C. to 190° C., still more preferably from 100° C. to 180° C.

The most superior polyester is polyethylene-2,6-naphthalenedicarboxylate (PEN).

The polyester has a limiting viscosity determined in an orthochlorophenol solvent at 35° C. of preferably from 0.40 to 0.9, more preferably from 0.45 to 0.70.

It is not preferred that the polyester contains polyalkylene glycol (molecular weight: 200 or more) in an amount of 1 wt % or more and/or a monomer having a metal sulfonate group such as sodium sulfoisophthalate in an amount of 1 mol % or more. If such a polyester support is used, its mechanical strength is lowered due to water absorption during development processing to thereby cause jamming or flaws in the developing machine.

Specific examples of preferred polyesters for use in the present invention are set forth below, but the present invention is by no means limited to these.

| | | |
|---|---|---|
| P-1: | Polyethylene naphthalate (PEN) [2,6-naphthalenedicarboxylic acid (NDCA)/ethylene glycol (EG) (100/100)] | Tg = 119° C. |
| P-2: | 2,6-NDCA/TPA/EG (50/50/100) | Tg = 92° C. |
| P-3: | 2,6-NDCA/TPA/EG (75/25/100) | Tg = 102° C. |
| P-4: | 2,6-NDCA/TPA/EG/BPA (bisphenol A) (50/50/75/25) | Tg = 112° C. |
| P-5: | 2,6-NDCA/EG/BPA (100/50/50) | Tg = 155° C. |

-continued

| P-6: | 2,6-NDCA/EG/BPA (100/25/75) | Tg = 155° C. |
|---|---|---|
| P-7: | 2,6-NDCA/EG/CHDM (cyclohexanedi-methanol)/BPA (100/25/25/50) | Tg = 150° C. |
| P-8: | 2,6-NDCA/NPG (neopentyl glycol)/EG (100/70/30) | Tg = 145° C. |
| P-9: | 2,6-NDCA/EG/BP (bisphenol) (100/20/80) | Tg = 130° C. |
| P-10: | PHBA/EG/2,6-NDCA (200/100/100) | Tg = 150° C. |
| P-11: | PEN/PET (60/40) | Tg = 95° C. |
| P-12: | PEN/PET (80/20) | Tg = 104° C. |
| P-13: | PAr (polyarylate)/PEN (50/50) | Tg = 142° C. |
| P-14: | PAr/PCT/PEN (10/10/80) | Tg = 135° C. |
| P-15: | PAr/PC/PEN (10/10/80) | Tg = 140° C. |
| P-16: | PEN/PET/PAr (50/25/25) | Tg = 108° C. |

Further, an ultraviolet absorbent may also be added to the polyester for the purpose of giving aging stability. The ultraviolet absorbent does not preferably have an absorption in a visible region and it is usually added in an amount of approximately from 0.5 wt % to 20 wt %, preferably from 1 wt % to 10 wt % based on the weight of polymer film. If the addition amount is less than 0.5 wt %, the ultraviolet light degradation cannot be suppressed. Examples of the ultraviolet absorbent include a benzophenone ultraviolet absorbent such as 2,4-dihydroxybenzophenone, 2-hydroxy-4-methoxybenzophenone, 2-hydroxy-4-n-octoxybenzophenone, 4-dodecyloxy-2-hydroxybenzophenone, 2,2',4,4'-tetrahydroxybenzophenone and 2,2'-dihydroxy-4,4'-dimethoxybenzophenone, a benzotriazole ultraviolet absorbent such as 2-(2'-hydroxy-5-methylphenyl)benzotriazole, 2-(2'-hydroxy-3',5'-di-t-butylphenyl)benzotriazole and 2-(2'-hydroxy-3'-di-t-butyl-5'-methylphenyl)benzotriazole, and a salicylic acid ultraviolet absorbent such as phenyl salicylate and methyl salicylate.

In order to evade a light piping phenomenon, a method where inactive inorganic particles or the like are incorporated into the film and a method where a dyestuff is added are known.

The dyestuff used for coloring film preferably has a grey color tone in view of general properties of the photographic material, superior heat resistance in the region of temperatures where the polyester film is produced and excellent compatibility with polyester.

The objective dyestuff can be prepared by mixing commercially available dyes for polyester such as DIARESIN produced by Mitubishi Kasei Corp. and KAYASET produced by Nippon Kayaku K.K.

After the polymer polymerized by a well known method is pelletized, the polyester is usually well dried and subjected to melt-extrusion from a T-die to form an unstretched film. In this case, it is preferred to previously filter the molten polymer through a filter. Examples of the filter include a wire screen, a sintered wire screen, a sintered metal, sands and glass fiber. The melting temperature in forming an unstretched film is preferably from the melting point (Tm) of the polymer to 330° C.

The film formation by biaxial stretching for the polyester of the present invention may be conducted according to the methods described in JP-A-50-109715 and JP-A-50-95374. For example, an aromatic polyester is melt-extruded at a temperature of from the melting point (Tm: °C.) to 70° C. higher than the Tm (Tm+70° C.) to obtain an unstretched film having an intrinsic viscosity of from 0.45 to 0.9, the resulting unstretched film is uniaxially (in the longitudinal direction or in the transverse direction) stretched to the magnification of from 2.5 to 5.0 at a temperature of from 10° C. lower than the Tg (Tg–10° C.) to 70° C. higher than the Tg (Tg+70° C.) (Tg: the glass transition temperature of the aromatic polyester), and then the uniaxially stretched film is stretched in the square direction to the above-described stretching direction (if the first stage stretching is done in the longitudinal direction, the second stage stretching is done in the transverse direction) to the magnification of from 2.0 to 4.0 at a temperature of from the Tg to 70° C. higher than the Tg (Tg+70° C.). The magnification in the longitudinal stretching is preferably from 2.3 to 3.7 times, more preferably from 2.4 to 3.5 times, and the magnification in the transverse stretching is preferably from 2.0 to 4.0 times, more preferably from 2.4 to 3.8 times, still more preferably from 2.5 to 3.6 times.

The biaxially stretched film is preferably subjected further to thermal fixing at a temperature of from 30° C. higher than Tg (Tg+30° C.) to the melting point (Tm), more preferably from 40° C. higher than the Tg (Tg+40° C.) to 10° C. lower than the Tm (Tm–10° C.), still more preferably from 60° C. higher than the Tg (Tg+60° C.) to 20° C. lower than the Tm (Tm–20° C.). The Tm used herein can be measured by a differential scanning calorimetry (DSC). More specifically, the Tm is the first transition temperature in the endothermic peak appeared when 10 mg of a sample is once heated in a nitrogen stream to 300° C. at 20° C./min., then rapidly cooled to room temperature and again heated at 20° C./min.

The support of the present invention has a thickness of from 50 to 200 μm, preferably from 80 to 115 μm, more preferably from 85 to 105 μm.

The undercoat layer provided between the surface-treated support and the light-sensitive layer will be described below. The undercoat layer may be provided either in a so-called superposition fashion comprising applying as the first layer a layer capable of sufficiently adhering to the support (hereinafter referred to as an undercoat first layer) and coating thereon as the second layer a layer capable of well bonding the undercoat first layer and the photographic layer together (hereinafter referred to as an undercoat second layer) or in a single-layer fashion comprising coating only one layer which well bonds the support and the photographic layer together.

Such coating can be conducted according to the method described in *Hatsumei-Kyokai Kokai Giho* (*Japanese Published Technical Report*), *Kogi No. 94-6023* "6. *Undercoating and Back Material*", pp. 18–22.

The silver halide photographic material of the present invention may further comprises a magnetic recording layer as described in JP-A-6-059357 for recording a variety of information. The magnetic recording layer is preferably applied on the back surface of the support layer and can be provided by coating or printing. Still further, the light-sensitive material may comprise an optically recordable space for recording a variety of information.

On the support of the present invention, a slide layer may also be provided. Known examples of the sliding agent used here include polyorganosiloxanes as described in JP-B-53-292 (the term "JP-B" as used herein means an "examined Japanese patent publication"), higher fatty acid amides as described in U.S. Pat. No. 4,275,146, higher fatty acid esters (esters of a fatty acid having from 10 to 24 carbon atoms and an alcohol having from 10 to 24 carbon atoms) as described in JP-B-58-33541, British Patent 927,446, JP-A-55-126238 and JP-A-58-90633, higher fatty acid metal salt as described in U.S. Pat. No. 3,933,516, esters of a straight-chained higher fatty acid and a straight-chained higher alcohol as described in JP-A-58-50534 and branched alkyl group-containing higher fatty acid-higher alcohol esters as described in WO90108115.8.

Such a slide layer can be provided according to the method described in *Hatsumei-Kyokai Kokai Giho* (*Japa-* nese *Published Technical Report*), *Kogi No*. 94-6023 "7. *Sliding Agent*", pp. 25–28.

The photographic layer of the photographic light-sensitive material according to the present invention will be described below.

The silver halide emulsion layer may be either for a color photographic material or for a black-and-white photographic material. Such an emulsion layer can be prepared according to the method described in *Hatsumei-Kyokai Kokai Giho* (*Japanese Published Technical Report*), *Kogi No*. 94-6023 "16. *Light-Sensitive Layer*", pp. 79–83.

The film obtained as described above is wound around a spool in a cartridge on use and the spool has a diameter of preferably from 5 to 11 mm, more preferably from 6 to 10 mm, still more preferably from 7 to 9 mm. If the diameter is less than this range, the curling habit is too much intensified to cause troubles in a mini lab, whereas if it is larger than this range, the miniaturization of cartridge cannot be realized.

The present invention will be described below in greater detail with reference to examples but the present invention should not be construed as being limited thereto. Various physical properties and characteristics were measured as follows.

(1) Creak Value

The creak value was measured at 25° C. and 60% RH using an apparatus as shown in the figure, which was produced by applying a tensile tester, according to the following procedure:

(1) a sample was cut into a rectangle having a size of 180 mm in width and 50 mm in length (Sample A);

(2) Sample A (22 in the figure) was attached to a smooth plate with the back layer facing upward and then fixed to a horizontal table (23 in the figure);

(3) a sample was cut into a rectangle having a size of 80 mm in width and 18 mm in length (Sample B);

(4) Sample B was attached to a box in the same size and having a weight of 500 g with the surface to be provided by a light-sensitive layer facing upward (21 in the figure);

(5) one end of a string was fastened to the center of one side in 18 mm-length of the box to which Sample B was attached and another end of the string was fastened to the load cell through a pulley (24 in the figure) fixed to the movable stage of the tensile tester (27 in the figure); and (6) the movable stage (25 in the figure) was pulled down at a rate of 200 mm/min. and the maximum load detected in the load cell (26 in the figure) was determined as the creak value.

(2) Difference in Roll Diameter

This was obtained by measuring the length between the core surface of the support before heat treatment and the outermost circumference of the roll at four points on the top and the bottom in both edges of the roll and determined according to the following equation:

Difference (%) in roll diameter=$\{(L_1-L_2)/(L_1+L_2)\}\times 100$ where $L_1$ represents the maximum length and $L_2$ represents the minimum length.

(3) Thickness of Air Layer between Supports (1) The radius of the roll before heat treatment was measured at five points in the width direction (five points in the seven parts divided equally in the width direction excluding two points at both ends) and an average value R (mm) was obtained.

(2) The core radius r (mm), the support thickness T (μm) and the support length L (m) were measured and the thickness A (μm) of the air layer between layers was obtained according to the following equation:

$A=\{(\pi/L)\times(R^2-r^2)\}-T$ (4) Height of Knurl (1) A 0.5 mm-thick aluminum plate was placed on a knurl of the support before heat treatment and the height was determined using a gauge for film thickness (for example, K351C or K352C manufactured by Anritsu Denki K.K.) ($H_1$);

(2) the thickness of the support nearest to the knurl measured as above was determined ($H_2$);

(3) the thickness of the aluminum plate used was determined ($H_3$);

(4) H=($H_1-H_2-H_3$) was obtained; and (5) this measurement was repeated ten times every edge of the support and an average of H was obtained and designated as the height of knurl.

(5) Winding Tension

A differential transformer-type tensile tester (for example, LX-TC-100, manufactured by Mitsubishi Electric Co., Ltd.) was installed to the roller in a winding exchanger and the tension at 25° C. was measured.

(6) Resistance of Electrically Conductive Layer

A sample was cut into a size of 1 cm in width and 5 cm in length and after silver paint was coated in the length direction, the humidity was conditioned for 2 hours at 25° C. and 10% RH (relative humidity), a voltage of 100 V was applied and the resistance in the width direction was examined.

(7) Glass Transition Temperature (Tg)

(1) 10 mg of a sample was placed under a nitrogen stream in an aluminum-made pan.

(2) The Tg was measured in a nitrogen stream using a differential scanning calorimetry (DSC) through the following procedure:

(i) the temperature was raised to 300° C. at 20° C./min. (first run);

(ii) the sample was rapidly cooled to room temperature to become amorphous; and (iii) the temperature was again raised at 20° C./min. (second run).

The Tg was determined as the arithmetical mean of a temperature at which deviation from the base line started and a temperature at which a new base line was recovered, in the second run.

EXAMPLE 1

(1) Preparation of Support (1-1) Preparation of PEN Support (Levels 1-1 to 1-26, 2-1 to 2-21, 3-3 to 3-26)

Polyethylene-2,6-naphthalate having added thereto Compound I-6 and Compound I-24 each having a chemical formula shown below in an amount of 54 ppm and 0.1% of spherical silica particles having an average particle diameter of 0.3 μm, based on the polyester solid content, was polymerized by ester interchange according to a usual method. The polymer had an intrinsic viscosity of 0.62.

The pellets obtained above were dried at 170° C. for 4 hours, molten at 300° C., extruded from a T-type die and cooled rapidly to form an unstretched film having such a thickness that the film thickness after heat fixing became 90 μm.

The film was longitudinally stretched at 140° C. to 3.2 times and then transversely stretched at 130° C. to 3.3 times. Thereafter, the biaxially stretched film was heat fixed at 220° C. for 30 seconds.

Thus, a roll having a width of 1.2 m and a length of 2,000 m was obtained.

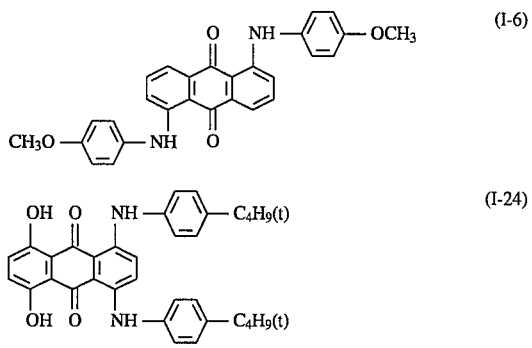

(1-2) Preparation of Copolymer/Polymer Blend Supports (Levels 1-27 to 1-29, 2-22 to 2-24, 3-27 to 3-29)

P-3 (levels 1-27, 2-22, 3-27):

A polyester copolymer having constituent elements consisting of 2,6-naphthalenedicarboxylic acid dimethyl ester-:terephthalic acid dimethyl ester:ethylene glycol (molar ratio: 75:25:100) was polymerized by ester interchange according to a usual method. To this polymer, the same dyes and spherical silica were added in the same amount as in PEN support. The polymer had an intrinsic viscosity of 0.62. This was dried under the same conditions as for the PEN support and biaxially stretched in sequence under the conditions shown in Table 1 to form a film. At this time, the longitudinal stretching temperature and the transverse stretching temperature were 130° C. and 120° C., respectively, and the processing time and temperature of heat fixing were 30 seconds and 220° C., respectively. The resulting biaxially stretched film had a thickness of 90 μm, a width of 1.2 m and a length of 2,000 m.

P-12 (levels 1-28, 2-23, 3-28):

The PEN polymerized as above and the PET polymerized as described below were blended in a weight ratio of 60:40 at 300° C. using a biaxial kneading extruder. The product was dried under the same conditions as for PEN and biaxially stretched to form a film. At this time, the longitudinal stretching temperature and the transverse stretching temperature were 110° C. and 100° C., respectively, and the processing time and temperature of heat fixing were 30 seconds and 220° C., respectively. The resulting biaxially stretched film had a thickness of 90 μm, a width of 1.2 m and a length of 2,000 m.

P-14 (levels 1-29, 2-24, 3-29):

Polyarylate (PAr) comprising bisphenol A and terephthalate as constituent elements and having an intrinsic viscosity of 0.55 was obtained by polymerization according to a usual method. This PAr and the PEN polymerized as above were dried at 190° C. for 4 hours and biaxially stretched in sequence under conditions shown in Table 1 to form a film. The longitudinal stretching temperature and the transverse stretching temperature were 160° C. and 150° C., respectively, and the processing time and temperature of heat fixing were 30 seconds and 230° C., respectively. The resulting biaxially stretched film had a thickness of 90 μm, a width of 1.2 m and a length of 2,000 m.

(1-3) Preparation of PET Support (Level 2-25)

According to a usual method, a PET support having a thickness of 95 μm was obtained. To this support, the same kinds of dyes and spherical silica were added in the same concentration as for the PEN support.

These supports were subjected to the following surface treatment, application of an electroconductive layer, heat treatment and undercoating, and specific procedures thereof for respective levels are described in Tables 1 to 3.

(2) Surface Treatment of Support

Each support was subjected to the following heat treatment.

(2-1) Glow Discharge Treatment (Table 1)

Four long cylindrical electrodes having a sectional diameter of 2 cm and a length of 120 cm were fixed to an insulating plate at a distance of 10 cm. This electrode board was fixed inside a vacuum tank and each support was driven while facing toward the electrode surface at a distance of 15 cm apart from the electrode surface to effect surface treatment for 2 seconds. A heat roller having a diameter of 50 cm with a heat controller was provided such that the film was put into contact with ¾ circuit of the heat roller immediately before the film passing the electrodes and further, the surface temperature of film was controlled to be 5° C. lower than the Tg (Tg–5° C.) of each film by bringing a thermocouple thermometer into contact with the film surface between the heat roller and the electrode zone.

The pressure in the vacuum tank was 0.2 Torr and the $H_2O$ partial pressure in the atmospheric gas was 75%. The discharge frequency was 30 KHz and the treatment strength for each level was as shown in Table 1. The vacuum glow discharge electrode was the same as used in the method described in EP-A2-0630087. After the discharge treatment, the support was brought into contact with a cooling roller having a diameter of 50 cm with a heat controller so that the surface temperature of the support was cooled to 30° C. and then taken up.

TABLE 1

| Level | Support | Sequence of Processing | | | | Surface Treatment Strength (kV · min/m²) | Creak Preventing Layer (Antistatic Layer) | |
|---|---|---|---|---|---|---|---|---|
| | | Surface Treatment | Electrically Conductive Layer | Heat Treatment | Under-coating | | Fine Particles in Coating Solution (part by weight) | Volume Resistance Power |
| 1-1 | PEN | 1 | 2 | 3 | 4 | 0.50 | 100 | 7.5 |
| 1-2 | " | " | " | " | " | 0.80 | " | " |
| 1-3 | " | " | " | " | " | 0.25 | " | " |
| 1-4 | " | " | " | " | " | 0.50 | 30 | " |
| 1-5 | " | " | " | " | " | " | 30 | " |
| 1-6 | " | " | " | " | " | " | 40 | " |
| 1-7 | " | " | " | " | " | " | 40 | " |
| 1-8 | " | " | " | " | " | " | 300 | 2.8 |
| 1-9 | " | " | " | " | " | " | 280 | 3.1 |
| 1-10 | " | " | " | " | " | " | 70 | 11.5 |
| 1-11 | " | " | " | " | " | " | 60 | 12.2 |
| 1-12 | " | " | " | " | " | " | 20 | 13.5 |
| 1-13 | " | " | " | " | " | " | 10 | 14.0 |
| 1-14 | " | " | " | " | " | " | 40 | 18.0 |
| 1-15 | " | " | " | " | " | " | 40 | 17.8 |
| 1-16 | " | " | " | " | " | " | 40 | 18.2 |
| 1-17 | " | " | " | " | " | " | 40 | 13.0 |
| 1-18 | " | " | " | " | " | " | 100 | 7.5 |
| 1-19 | " | " | " | " | " | " | " | " |
| 1-20 | " | " | " | " | " | " | " | " |
| 1-21 | " | " | " | " | " | " | " | " |
| 1-22 | " | " | " | " | " | " | " | " |
| 1-23 | " | 1 | 3 | 2 | 4 | 0.25 | 100 | 7.5 |
| 1-24 | " | 2 | 3 | 1 | 4 | 0.10 | " | " |
| 1-25 | " | " | " | " | " | 0.25 | " | " |
| 1-26 | " | 1 | 3 | 4 | 2 | 0.10 | " | " |
| 1-27 | P-3 | 1 | 2 | 3 | 4 | 0.50 | 100 | 7.5 |
| 1-28 | P-12 | " | " | " | " | " | " | " |
| 1-29 | P-14 | " | " | " | " | " | " | " |

| Level | Height of Knurl (μm) | Creak Value (g) | Haze (%) | Winding Tension | | Thickness of Air Layer (μm) | Difference in Roll Diameter (%) | Planeness/Roll Form After Heat Treatment | | | | Remarks |
|---|---|---|---|---|---|---|---|---|---|---|---|---|
| | | | | Initial Tension (kg/m) | Final Tension (kg/m) | | | Self-adhesion Occurrence | | Length of Poor Planeness (m) | Slippage in Winding (mm) | |
| | | | | | | | | Strong | Weak | | | |
| 1-1 | 20 | 180 | 1.1 | 20 | 15 | 3 | 5 | 0 | 0 | 20 | 2 | Invention |
| 1-2 | " | 580 | " | " | " | " | " | 0 | 3 | 180 | 0 | " |
| 1-3 | " | 18 | " | " | " | " | " | 0 | 0 | 10 | 8 | " |
| 1-4 | 1.2 | 500 | " | " | " | 1 | 4 | 0 | 0 | 80 | 2 | " |
| 1-5 | 0.8 | 500 | " | " | " | 0.8 | 4 | 0 | 2 | 120 | 2 | " |
| 1-6 | 45 | 18 | " | " | " | 9 | 7 | 0 | 0 | 10 | 14 | " |
| 1-7 | 55 | 18 | " | " | " | 10 | 7 | 0 | 0 | 12 | 16 | " |
| 1-8 | 20 | 12 | 3.1 | " | " | 3 | 5 | 0 | 0 | 11 | 7 | " |
| 1-9 | " | 15 | 2.9 | " | " | " | " | 0 | 0 | 12 | 7 | " |
| 1-10 | " | 270 | 0.9 | " | " | " | " | 0 | 0 | 25 | 2 | " |
| 1-11 | " | " | 0.9 | " | " | " | " | 0 | 0 | 23 | 2 | " |
| 1-12 | " | 580 | 0.7 | " | " | " | " | 0 | 3 | 180 | 0 | " |
| 1-13 | " | 630 | 0.6 | " | " | " | " | 2 | 5 | 280 | 0 | " |
| 1-14 | " | 450 | 0.8 | " | " | " | " | 0 | 4 | 150 | 3 | Invention |
| 1-15 | 20 | 460 | 0.8 | 20 | 15 | 3 | 5 | 0 | 7 | 180 | 0 | " |
| 1-16 | " | 450 | 0.8 | " | " | " | " | 0 | 6 | 175 | 0 | " |
| 1-17 | " | 450 | 0.8 | " | " | " | " | 0 | 0 | 35 | 3 | " |
| 1-18 | " | 270 | 1.1 | 4.5 | 3.5 | 9 | 9 | 0 | 0 | 15 | 12 | " |
| 1-19 | " | " | 1.1 | 74 | 60 | 1.5 | 1 | 0 | 0 | 75 | 0 | " |
| 1-20 | " | " | " | 76 | 62 | 1.4 | 1 | 0 | 0 | 120 | 0 | " |
| 1-21 | " | 180 | " | 20 | 15 | 3 | 9 | 0 | 0 | 80 | 14 | " |
| 1-22 | " | " | " | " | " | " | 12 | 1 | 7 | 280 | 22 | Comparison |
| 1-23 | 20 | 180 | 1.1 | 20 | 15 | 3 | 5 | 0 | 5 | 75 | 0 | Invention |
| 1-24 | " | 180 | 1.1 | 20 | 15 | " | " | 0 | 3 | 90 | 0 | " |
| 1-25 | " | 180 | " | " | " | " | " | 0 | 5 | 90 | 0 | " |
| 1-26 | " | 450 | " | 8 | 6 | " | " | 0 | 8 | 180 | 0 | " |
| 1-27 | 20 | 180 | 1.1 | 20 | 15 | 3 | 5 | 0 | 0 | 25 | 2 | Invention |
| 1-28 | " | 170 | 1.3 | " | " | " | " | 0 | 0 | 20 | 3 | " |
| 1-29 | " | 180 | 1.5 | " | " | " | " | 0 | 5 | 30 | 2 | " |

(2-2) Flame treatment (Table 2)

The front and back surfaces of support were subjected to flame treatment using a flame treatment apparatus manufactured by Kasuga Denki K.K. The flame heating value for each level is shown in Table 2. The flame treatment was applied to any level at a propane gas/air ratio of 1/17 and at a distance between the inner flame and the support of 1 cm while bringing the level into contact with a cooling roller through which water of 10° C. was passed.

TABLE 2

| Level | Support | Tg (°C.) | Surface Treatment | Electrically Conductive Layer | Heat Treatment | Undercoating | Surface Treatment Form | Strength (kCAL/m) | Fine Particle in Coating Solution (part by weight) | Volume Resistance Power | Height of Knurl (μm) | Creak Value (g) | Haze (%) |
|---|---|---|---|---|---|---|---|---|---|---|---|---|---|
| 2-1 | PEN | 119 | 1 | 2 | 3 | 4 | flame | 20 | 100 | 7.5 | 20 | 160 | 1.1 |
| 2-2 | " | " | " | " | " | " | " | 30 | " | " | " | 550 | " |
| 2-3 | " | " | " | " | " | " | " | 40 | " | " | " | 600 | " |
| 2-4 | " | " | " | " | " | " | " | 7 | " | " | " | 17 | " |
| 2-5 | " | " | " | " | " | " | " | 2 | " | " | " | 8 | " |
| 2-6 | " | " | " | " | " | " | " | 30 | " | " | 1.2 | 540 | " |
| 2-7 | " | " | " | " | " | " | " | " | " | " | 0.8 | 530 | " |
| 2-8 | " | " | " | " | " | " | " | 7 | " | " | 95 | 15 | " |
| 2-9 | " | " | " | " | " | " | " | " | " | " | 105 | 14 | " |
| 2-10 | " | " | " | " | " | " | " | 20 | " | 3.1 | 20 | 11 | 3.1 |
| 2-11 | " | " | " | " | " | " | " | " | " | 2.8 | " | 11 | 2.9 |
| 2-12 | " | " | " | " | " | " | " | " | " | 11.5 | " | 250 | 0.9 |
| 2-13 | " | " | " | " | " | " | " | " | " | 12.2 | " | " | 0.9 |
| 2-14 | " | " | " | " | " | " | " | " | " | 7.5 | " | " | 1.1 |
| 2-15 | " | " | " | " | " | " | " | " | " | " | " | " | " |
| 2-16 | " | " | " | " | " | " | " | " | " | " | " | " | " |
| 2-17 | " | " | " | " | " | " | " | " | " | " | " | " | " |
| 2-18 | " | " | 1 | 3 | 2 | 4 | " | 7 | " | 7.5 | 20 | 140 | 1.1 |
| 2-19 | " | " | 2 | 3 | 1 | 4 | " | 2 | " | " | " | 140 | " |
| 2-20 | " | " | " | " | " | " | " | 7 | " | " | " | 140 | " |
| 2-21 | " | " | 1 | 3 | 4 | 2 | " | 2 | " | " | " | 400 | " |
| 2-22 | P-3 | 102 | 1 | 2 | 3 | 4 | " | 20 | " | 7.5 | 20 | 150 | 1.1 |
| 2-23 | P-12 | 95 | " | " | " | " | " | " | " | " | " | 140 | 1.3 |
| 2-24 | P-14 | 142 | " | " | " | " | " | " | " | " | " | 150 | 1.5 |
| 2-25 | PET | 70 | 1 | 2 | 3 | 4 | " | " | " | 7.5 | " | 160 | 0.9 |

| Level | Winding Tension Initial (kg/m) | Winding Tension Final (kg/m) | After Heat Treatment Blocking | After Heat Treatment Planeness | Slippage in Winding | Adhesion to Light-Sensitive Layer In Dry Condition | Adhesion to Light-Sensitive Layer In Wet Condition | Curling Habit Before Development (m-1) | Curling Habit After Development (m-1) | Mini-Lab. Aptitude Folding | Mini-Lab. Aptitude Unevenness | Remarks |
|---|---|---|---|---|---|---|---|---|---|---|---|---|
| 2-1 | 20 | 15 | o | o | o | o | o | 133 | 65 | OK | OK | Invention |
| 2-2 | " | " | Δ | Δ | o | ⊚ | ⊚ | 132 | 63 | OK | OK | Invention |
| 2-3 | " | " | X | X | o | ⊚ | ⊚ | 125 | 60 | OK | OK | Comparison |
| 2-4 | " | " | o | ⊚ | o | Δ | Δ | 134 | 64 | OK | OK | Invention |
| 2-5 | " | " | o | ⊚ | o | X | X | 135 | 63 | OK | OK | Comparison |
| 2-6 | " | " | Δ | Δ | o | ⊚ | ⊚ | 132 | 62 | OK | OK | Invention |
| 2-7 | " | " | X | X | o | ⊚ | ⊚ | 131 | 63 | OK | OK | Comparison |
| 2-8 | " | " | o | ⊚ | Δ | o | o | 138 | 66 | OK | OK | Invention |
| 2-9 | " | " | o | ⊚ | X | o | o | 135 | 62 | OK | OK | Comparison |
| 2-10 | " | " | o | ⊚ | o | o | o | 130 | 60 | OK | OK | Invention |
| 2-11 | " | " | o | ⊚ | o | o | o | 133 | 61 | OK | OK | " |
| 2-12 | " | " | o | o | o | o | o | 128 | 63 | OK | OK | " |
| 2-13 | " | " | o | Δ | o | o | o | 137 | 65 | OK | OK | " |
| 2-14 | 4.5 | 3.5 | o | o | o | o | o | 135 | 60 | OK | OK | " |
| 2-15 | 3.5 | 2.5 | o | Δ | o | o | o | 132 | 57 | OK | OK | " |
| 2-16 | 74 | 60 | o | o | o | o | o | 132 | 64 | OK | OK | " |
| 2-17 | 76 | 62 | o | Δ | o | o | o | 136 | 56 | OK | OK | " |
| 2-18 | 20 | 15 | o | o | o | o | o | 134 | 60 | OK | OK | Invention |
| 2-19 | " | " | o | o | o | X | X | — | — | — | — | Comparison |
| 2-20 | " | " | o | o | o | o | o | 158 | 74 | ND | OK | " |
| 2-21 | " | " | X | X | o | — | — | — | — | — | — | " |
| 2-22 | 20 | 15 | o | o | o | o | o | 135 | 66 | OK | OK | Invention |

TABLE 2-continued

| | | | | | | | | | | | | |
|---|---|---|---|---|---|---|---|---|---|---|---|---|
| 2-23 | " | " | ○ | ○ | ○ | ○ | ○ | 137 | 65 | OK | OK | " |
| 2-24 | " | " | ○ | ○ | ○ | ○ | ○ | 120 | 50 | OK | OK | " |
| 2-25 | " | " | ○ | ○ | ○ | ○ | ○ | 233 | 228 | NG | NG | Comparison |

(2-3) Ultraviolet (UV) Treatment (Table 3)

The front and back surfaces of the support were subjected to UV treatment using a high-pressure mercury lamp while keeping the distance between the lamp and the support at 30 cm. The treatment strength for each level is shown in Table 3.

TABLE 3

| | | Sequence of Processing | | | | Surface Treatment | Creak Preventing Layer (Antistatic Layer) | |
|---|---|---|---|---|---|---|---|---|
| Level | Support | Surface Treatment | Electricallay Conductive Layer | Heat Treatment | Under-coating | Strength (mJ/cm²) | Fine Particles in Coating Solution (part by weight) | Volume Resistance Power |
| 3-1 | PEN | 1 | 2 | 3 | 4 | 300 | 100 | 7.5 |
| 3-2 | " | " | " | " | " | 1500 | " | " |
| 3-3 | " | " | " | " | " | 200 | " | " |
| 3-4 | " | " | " | " | " | 300 | 30 | " |
| 3-5 | " | " | " | " | " | " | 30 | " |
| 3-6 | " | " | " | " | " | " | 40 | " |
| 3-7 | " | " | " | " | " | " | 40 | " |
| 3-8 | " | " | " | " | " | " | 300 | 2.8 |
| 3-9 | " | " | " | " | " | " | 280 | 3.1 |
| 3-10 | " | " | " | " | " | " | 70 | 11.5 |
| 3-11 | " | " | " | " | " | " | 60 | 12.2 |
| 3-12 | " | " | " | " | " | " | 20 | 13.5 |
| 3-13 | " | " | " | " | " | " | 10 | 14.0 |
| 3-14 | " | " | " | " | " | " | 40 | 18.0 |
| 3-15 | " | " | " | " | " | 0.50 | 40 | 17.8 |
| 3-16 | " | " | " | " | " | " | 40 | 18.2 |
| 3-17 | " | " | " | " | " | " | 40 | 13.0 |
| 3-18 | " | " | " | " | " | " | 100 | 7.5 |
| 3-19 | " | " | " | " | " | " | " | " |
| 3-20 | " | " | " | " | " | " | " | " |
| 3-21 | " | " | " | " | " | " | " | " |
| 3-22 | " | " | " | " | " | " | " | " |
| 3-23 | " | 1 | 3 | 2 | 4 | 200 | 100 | 7.5 |
| 3-24 | " | 2 | 3 | 1 | 4 | 100 | " | " |
| 3-25 | " | " | " | " | " | 200 | " | " |
| 3-26 | " | 1 | 3 | 4 | 2 | 100 | " | " |
| 3-27 | P-3 | 1 | 2 | 3 | 4 | 200 | 100 | 7.5 |
| 3-28 | P-12 | " | " | " | " | " | " | " |
| 3-29 | P-14 | " | " | " | " | " | " | " |

| | Height of Knurl (μm) | Creak Value (g) | Haze (%) | Winding Tension | | Difference | | Planeness/Roll Form After Heat Treatment | | | | |
|---|---|---|---|---|---|---|---|---|---|---|---|---|
| | | | | Initial Tension (kg/m) | Final Tension (kg/m) | of Air Layer (μm) | in Roll Diameter (%) | Self-adhesion Occurrence | | Length of Poor Planeness (m) | Slippage in Winding (mm) | Remarks |
| Level | | | | | | | | Strong | Weak | | | |
| 3-1 | 20 | 180 | 1.1 | 20 | 15 | 3 | 5 | 0 | 0 | 25 | 3 | Invention |
| 3-2 | " | 580 | " | " | " | " | " | 0 | 2 | 175 | 0 | " |
| 3-3 | " | 18 | " | " | " | " | " | 0 | 0 | 11 | 7 | " |
| 3-4 | 1.2 | 500 | " | " | " | 1 | 4 | 0 | 0 | 85 | 3 | " |
| 3-5 | 0.8 | 500 | " | " | " | 0.8 | 4 | 0 | 1 | 120 | 2 | " |
| 3-6 | 45 | 18 | " | " | " | 9 | 7 | 0 | 0 | 12 | 14 | " |
| 3-7 | 55 | 18 | " | " | " | 10 | 7 | 0 | 0 | 10 | 16 | " |
| 3-8 | 20 | 12 | 3.1 | " | " | 3 | 5 | 0 | 0 | 12 | 6 | " |
| 3-9 | " | 12 | 2.9 | " | " | " | " | 0 | 0 | 14 | 7 | " |
| 3-10 | " | 270 | 0.9 | " | " | " | " | 0 | 0 | 30 | 3 | " |
| 3-11 | " | " | 0.9 | " | " | " | " | 0 | 0 | 25 | 3 | " |
| 3-12 | " | 580 | 0.7 | " | " | " | " | 0 | 2 | 185 | 0 | " |
| 3-13 | " | 610 | 0.6 | " | " | " | " | 2 | 4 | 270 | 0 | " |

TABLE 3-continued

| | | | | | | | | | | | | |
|---|---|---|---|---|---|---|---|---|---|---|---|---|
| 3-14 | " | 450 | 0.8 | " | " | " | " | 0 | 5 | 160 | 4 | Invention |
| 3-15 | 20 | 460 | 0.8 | 20 | 15 | 3 | 5 | 0 | 8 | 185 | 0 | " |
| 3-16 | " | 450 | 0.8 | " | " | " | " | 0 | 6 | 175 | 0 | " |
| 3-17 | " | 450 | 0.8 | " | " | " | " | 0 | 0 | 30 | 2 | " |
| 3-18 | " | 270 | 1.1 | 4.5 | 3.5 | 9 | 9 | 0 | 0 | 15 | 12 | " |
| 3-19 | " | " | 1.1 | 74 | 60 | 1.5 | 1 | 0 | 0 | 80 | 0 | " |
| 3-20 | " | " | " | 76 | 62 | 1.4 | 1 | 0 | 0 | 130 | 0 | " |
| 3-21 | " | 180 | " | 20 | 15 | 3 | 9 | 0 | 0 | 85 | 14 | " |
| 3-22 | " | " | " | " | " | " | 12 | 1 | 9 | 285 | 21 | Comparison |
| 3-23 | 20 | 180 | 1.1 | 20 | 15 | 3 | 5 | 0 | 6 | 70 | 0 | Invention |
| 3-24 | " | 180 | 1.1 | 20 | 15 | " | " | 0 | 4 | 85 | 0 | " |
| 3-25 | " | 180 | " | " | " | " | " | 0 | 5 | 85 | 0 | " |
| 3-26 | " | 450 | " | " | " | " | " | 0 | 9 | 185 | 0 | " |
| 3-27 | 20 | 180 | 1.1 | 20 | 15 | 3 | 5 | 0 | 0 | 25 | 3 | Invention |
| 3-28 | " | 170 | 1.3 | " | " | " | " | 0 | 0 | 25 | 3 | " |
| 3-29 | " | 180 | 1.5 | " | " | " | " | 0 | 6 | 30 | 2 | " |

(3) Coating of Back First Layer

To each support which had been already surface treated, on the surface to be coated with an emulsion (the surface opposite to the surface brought into contact with a casting drum during film formation), a back formulation having the following composition was applied by means of a wire bar in an amount of 5 ml/m² and after drying it at 5° C. lower than the Tg (Tg−5° C.) for 2 minutes, the support was taken up.

| | |
|---|---|
| Gelatin | 1.0 part by weight |
| Distilled water | 1.0 part by weight |
| Acetic acid | 1.0 part by weight |
| Methanol | 50.0 parts by weight |
| Ethylene dichloride | 50.0 parts by weight |
| p-Chlorophenol | 4.0 parts by weight |

(4) Coating of Back Second Layer (Antistatic Layer)

230 Parts by weight of stannic chloride hydrate and 23 parts of antimony trichloride were dissolved in 3,000 parts by weight of ethanol to obtain a uniform solution. To the resulting solution, an aqueous solution of 1N sodium hydroxide was added dropwise until the pH of the above-described solution reached 3 to obtain a coprecipitate of colloidal stannic oxide and antimony oxide. The resulting coprecipitate was allowed to stand at 50° C. for 24 hours and then a reddish brown colloidal precipitate was obtained.

The reddish brown colloidal precipitate was separated by centrifugation and water was added to the precipitate to effect water washing by centrifugation so as to remove excess ions. This procedure was repeated three times and excess ions were removed.

200 Parts by weight of colloidal precipitate from which excess ions were removed were redispersed in 1,500 parts by weight of water and atomized in a calcining furnace heated at 500° C. to obtain bluish fine particles of a composite of stannic oxide and antimony oxide having an average particle size of 0.005 µm. The resulting fine particle powder had a resistivity of 25 Ω.cm.

A mixed solution of 40 parts by weight of the above-described fine powder and 60 parts by weight of water was adjusted to have a pH of 7.0, rudely dispersed by a stirrer and then dispersed in a horizontal sand mill (Dynomill, produced by Willy A. Backfen AG) until the residence time reached 30 minutes to produce a dispersion solution in which primary particles partly aggregated to form a secondary aggregate having a size of 0.05 µm.

A solution having the following formulation was coated on each support to give a dry thickness of 0.3 µm and then dried at 110° C. for 30 seconds.

| | |
|---|---|
| Electrically conductive fine particle dispersion prepared above | in an amount as shown in Tables 1 to 3 |
| Gelatin (lime-processed gelatin containing 100 ppm of $Ca^{++}$) | 10 parts by weight |
| Water | 270 parts by weight |
| Methanol | 600 parts by weight |
| Resorcin | 20 parts by weight |
| Nonionic surfactant (Nonionic Surfactant I-13 described in JP-B-3-27099) | 0.1 part by weight |

In place of the above-described electrically conductive fine particle dispersion, a 40 wt % aqueous solution of spherical silica (diameter: 0.15 µm) was added for levels 1-14 and 3-14, a 40 wt % aqueous solution of alumina (diameter: 0.15 µm) for levels 1-15 and 3-15, and a 40 wt % aqueous solution of calcium carbonate (diameter: 0.15 µm) for levels 1-16 and 3-16.

(5) Knurling

Knurls in a width of 10 mm and a height of 10 µm were provided through the entire length at both edges of each support. At this time, the die (a pair of rollers with irregularities; irregularities being given longitudinally and transversely at a pitch of 0.5 mm) had a temperature of 150° C. and was pushed at a pressure of 2 kg.

(6) Heat Treatment of Support

Each support was wound around a core at room temperature under the following conditions:
  Core: an aluminum-made hollow core having a diameter of 300 mm and a length of 1,500 mm
  Support: 1,200 mm in width and 2,000 m in length
  Winding tension: as described in Tables 1 to 3
  Each of rolled supports was placed in a thermostat and subjected to heat treatment under the following conditions. The winding around the core was conducted in all cases with the back layer-coated surface facing inwardly.
  Temperature in thermostat: 5° C. lower than the Tg of each support for each level Time: stored at 5° C. lower than the Tg for 4 days and cooled to room temperature for 3 days

(7) Coating of Undercoat Layer (on Emulsion-Layer Side)

(7-1) Support Subjected to Glow Discharge Treatment

The undercoating solution having the following composition was coated in an amount of 10 ml/m² on each support by means of a wire bar and then dried at 115° C. for 2 minutes and the resulting support was taken up.

| Gelatin | 10.0 parts by weight |
| Water | 24.0 parts by weight |
| Methanol | 961.0 parts by weight |
| Salicylic acid | 3.0 parts by weight |
| Polyamide-epichlorohydrin resin described in Synthesis Example 1 of JP-A-51-3619 | 0.5 part by weight |
| Nonionic surfactant (Nonionic Surfactant I-13 described in JP-B-3-27099) | 0.1 part by weight |

(7-2) Support Subjected to Flame and Ultraviolet Treatments

The undercoating solution having the following composition was coated in an amount of 10 ml/m² on each support by means of a wire bar and then dried at 115° C. for 2 minutes and the resulting support was taken up.

| Gelatin | 10.0 parts by weight |
| Water | 10.0 parts by weight |
| Methanol | 500.0 parts by weight |
| Acetic acid | 10.0 parts by weight |
| Ethylene dichloride | 500.0 parts by weight |
| p-Chlorophenol | 40.0 parts by weight |

On the resulting undercoated surface, the light-sensitive layers described later were provided.

(8) Coating of Back Third Layer

After the completion of surface treatment and coating of the back first and second layers and the undercoat layer, a solution having the following formulation was coated on each support to give a dry thickness of 1.2 μm and then dried at 5° C. lower than Tg (Tg–5° C.).

| Diacetyl cellulose | 100 parts by weight |
| Trimethylolpropane-3-toluenediisocyanate | 25 parts by weight |
| Methyl ethyl ketone | 1,050 parts by weight |
| Cyclohexanone | 1,050 parts by weight |

(9) Coating of Back Fourth Layer (Slide Layer)

(9-1) Preparation of First Solution for Slide Layer

The following first solution was dissolved under heating at 90° C. and after adding to the second solution, the mixture was dispersed in a high-pressure homogenizer to provide a dispersion crude solution for the slide layer.

| First solution | |
| --- | --- |
| Sliding agent-1: $C_6H_{13}CH(OH)(CH_2)_{10}COOC_{40}H_{61}$ | 0.7 g |
| Sliding agent-2: $n\text{-}C_{17}H_{35}COOC_{40}H_{81}\text{-}n$ | 1.1 g |
| Xylene | 2.5 g |

(9-2) Preparation of Second Solution for Slide Layer

To the above-described first layer for the slide layer, the following binder and solvents were added to provide a coating solution.

| Propylene glycol monomethylether | 34.0 g |
| Diacetyl cellulose | 3.0 g |
| Acetone | 600.0 g |
| Cyclohexanone | 350.0 g |

(9-3) Coating of Slide Layer

The coating solution prepared above was coated on the back uppermost layer of each level in an amount of 10 ml/m² by means of a wire bar.

(10) Preparation of Photographic Material

A multi-layer color photographic material as a sample was prepared by coating layers each having the following composition in a superposed fashion on each support.

Composition of Light-Sensitive Layer

Main materials used in each layer are classified as follows:
ExC: cyan coupler
ExM: magenta coupler
ExY: yellow coupler
ExS: sensitizing dye
UV: ultraviolet absorbent
HBS: high-boiling point organic solvent
H: gelatin hardening agent Numerals corresponding to respective ingredients show coating amounts expressed by the unit g/m² and in case of silver halide, they show coating amounts in terms of silver. With respect to sensitizing dyes, the coating amount is shown by the unit mole per mole of silver halide in the same layer.

| First Layer (antihalation layer) | | |
| --- | --- | --- |
| Black colloidal silver | as silver | 0.09 |
| Gelatin | | 1.60 |
| ExM-1 | | 0.12 |
| ExF-1 | | $2.0 \times 10^{-3}$ |
| Solid disperse dye ExF-2 | | 0.030 |
| Solid disperse dye ExF-3 | | 0.040 |
| HBS-1 | | 0.15 |
| HBS-2 | | 0.02 |
| Second Layer (interlayer) | | |
| Silver iodobromide emulsion M | as silver | 0.065 |
| ExC-2 | | 0.04 |
| Polyethylacrylate latex | | 0.20 |
| Gelatin | | 1.04 |

Third Layer (low sensitive red-sensitive emulsion layer)

| | | |
|---|---|---|
| Silver iodobromide emulsion A | as silver | 0.25 |
| Silver iodobromide emulsion B | as silver | 0.25 |
| ExS-1 | | $6.9 \times 10^{-5}$ |
| ExS-2 | | $1.8 \times 10^{-5}$ |
| ExS-3 | | $3.1 \times 10^{-4}$ |
| ExC-1 | | 0.17 |
| ExC-3 | | 0.030 |
| ExC-4 | | 0.10 |
| ExC-5 | | 0.020 |
| ExC-6 | | 0.010 |
| Cpd-2 | | 0.025 |
| HBS-1 | | 0.10 |
| Gelatin | | 0.87 |

Fourth Layer (medium sensitive red-sensitive emulsion layer)

| | | |
|---|---|---|
| Silver iodobromide emulsion C | as silver | 0.70 |
| ExS-1 | | $3.5 \times 10^{-4}$ |
| ExS-2 | | $1.6 \times 10^{-5}$ |
| ExS-3 | | $5.1 \times 10^{-4}$ |
| ExC-1 | | 0.13 |
| ExC-2 | | 0.060 |
| ExC-3 | | 0.0070 |
| ExC-4 | | 0.090 |
| ExC-5 | | 0.015 |
| ExC-6 | | 0.0070 |
| Cpd-2 | | 0.023 |
| HBS-1 | | 0.10 |
| Gelatin | | 0.75 |

Fifth Layer (high sensitive red-sensitive emulsion layer)

| | | |
|---|---|---|
| Silver iodobromide emulsion D | as silver | 1.40 |
| ExS-1 | | $2.4 \times 10^{-4}$ |
| ExS-2 | | $1.0 \times 10^{-4}$ |
| ExS-3 | | $3.4 \times 10^{-4}$ |
| ExC-1 | | 0.10 |
| ExC-3 | | 0.045 |
| ExC-6 | | 0.020 |
| ExC-7 | | 0.010 |
| Cpd-2 | | 0.050 |
| HBS-1 | | 0.22 |
| HBS-2 | | 0.050 |
| Gelatin | | 1.10 |

Sixth Layer (interlayer)

| | |
|---|---|
| Cpd-1 | 0.090 |
| Solid disperse dye ExF-4 | 0.030 |
| HBS-1 | 0.050 |
| Polyethylacrylate latex | 0.15 |
| Gelatin | 1.10 |

Seventh Layer (low sensitive green-sensitive emulsion layer)

| | | |
|---|---|---|
| Silver iodobromide emulsion E | as silver | 0.15 |
| Silver iodobromide emulsion F | as silver | 0.10 |
| Silver iodobromide emulsion G | as silver | 0.10 |
| ExS-4 | | $3.0 \times 10^{-5}$ |
| ExS-5 | | $2.1 \times 10^{-4}$ |
| ExS-6 | | $8.0 \times 10^{-4}$ |
| ExM-2 | | 0.33 |
| ExM-3 | | 0.086 |
| ExY-1 | | 0.015 |
| HBS-1 | | 0.30 |
| HBS-3 | | 0.010 |
| Gelatin | | 0.73 |

Eighth Layer (medium sensitive green-sensitive emulsion layer)

| | | |
|---|---|---|
| Silver iodobromide emulsion H | as silver | 0.80 |
| ExS-4 | | $3.2 \times 10^{-5}$ |
| ExS-5 | | $2.2 \times 10^{-4}$ |
| ExS-6 | | $8.4 \times 10^{-4}$ |
| ExC-8 | | 0.010 |
| ExM-2 | | 0.10 |
| ExM-3 | | 0.025 |
| ExY-1 | | 0.018 |
| ExY-4 | | 0.010 |
| ExY-5 | | 0.040 |
| HBS-1 | | 0.13 |
| HBS-3 | | $4.0 \times 10^{-3}$ |
| Gelatin | | 0.80 |

Ninth Layer (high sensitive green-sensitive emulsion layer)

| | | |
|---|---|---|
| Silver iodobromide emulsion I | as silver | 1.25 |
| ExS-4 | | $3.7 \times 10^{-5}$ |
| ExS-5 | | $8.1 \times 10^{-5}$ |
| ExS-6 | | $3.2 \times 10^{-4}$ |
| ExC-1 | | 0.010 |
| ExM-1 | | 0.020 |
| ExM-4 | | 0.025 |
| ExM-5 | | 0.040 |
| Cpd-3 | | 0.040 |
| HBS-1 | | 0.25 |
| Polyethylacrylate latex | | 0.15 |
| Gelatin | | 1.33 |

Tenth Layer (yellow filter layer)

| | | |
|---|---|---|
| Yellow colloidal silver | as silver | 0.015 |
| Cpd-1 | | 0.16 |
| Solid disperse dye ExF-5 | | 0.060 |
| Solid disperse dye ExF-6 | | 0.060 |
| Oil-soluble dye ExF-7 | | 0.010 |
| HBS-1 | | 0.60 |
| Gelatin | | 0.60 |

Eleventh Layer (low sensitive blue-sensitive emulsion layer)

| | | |
|---|---|---|
| Silver iodobromide emulsion J | as silver | 0.09 |
| Silver iodobromide emulsion K | as silver | 0.09 |
| ExS-7 | | $8.6 \times 10^{-4}$ |
| ExC-8 | | $7.0 \times 10^{-3}$ |
| ExY-1 | | 0.050 |
| ExY-2 | | 0.22 |
| ExY-3 | | 0.50 |
| ExY-4 | | 0.020 |
| Cpd-2 | | 0.10 |
| Cpd-3 | | $4.0 \times 10^{-3}$ |
| HBS-1 | | 0.28 |
| Gelatin | | 1.20 |

Twelfth Layer (high sensitive blue-sensitive emulsion layer)

| | | |
|---|---|---|
| Silver iodobromide emulsion L | as silver | 1.00 |
| ExS-7 | | $4.0 \times 10^{-4}$ |
| ExY-2 | | 0.10 |
| ExY-3 | | 0.10 |
| ExY-4 | | 0.010 |
| Cpd-2 | | 0.10 |
| Cpd-3 | | $1.0 \times 10^{-3}$ |
| HBS-1 | | 0.070 |
| Gelatin | | 0.70 |

Thirteenth Layer (first protective layer)

| | |
|---|---|
| UV-1 | 0.19 |
| UV-2 | 0.075 |
| UV-3 | 0.065 |
| ExF-8 | 0.045 |
| ExF-9 | 0.050 |
| HBS-1 | $5.0 \times 10^{-2}$ |
| HBS-4 | $5.0 \times 10^{-2}$ |
| Gelatin | 1.8 |

Fourteenth Layer (second protective layer)

| | | |
|---|---|---|
| Silver iodobromide emulsion M | as silver | 0.10 |
| H-1 | | 0.40 |
| B-1 (diameter: 1.7 μm) | | $5.0 \times 10^{-2}$ |
| B-2 (diameter: 1.7 μm) | | 0.15 |
| B-3 | | 0.05 |
| S-1 | | 0.20 |
| Gelatin | | 0.70 |

Further, in order to provide good preservability, processability, pressure resistance, antimold/fungicidal property, antistatic property and coatability, W-1, W-2, W-3, B-4, B-5, B-6, F-1, F-2, F-3, F-4, F-5, F-6, F-7, F-8, F-9, F-10, F-11, F-12, F-13, F-14, F-15, F-16, F-17, iron salt, lead slat, gold salt, platinum salt, palladium salt, iridium salt or rhodium salt is added to each layer.

TABLE 4

|  | Average AgI Content (%) | Coefficient of Fluctuation in AgI Content of Grains (%) | Mean Grain Size Sphere-corresponding Diameter (μm) | coefficient of Fluctuation in Grain Size (%) | Circle-corresponding Projected Area Diameter (μm) | Diameter/ Thickness Ratio |
|---|---|---|---|---|---|---|
| Emulsion A | 1.7 | 10 | 0.46 | 15 | 0.56 | 5.5 |
| Emulsion B | 3.5 | 15 | 0.57 | 20 | 0.78 | 4.0 |
| Emulsion C | 8.9 | 25 | 0.66 | 25 | 0.83 | 5.8 |
| Emulsion D | 8.9 | 18 | 0.84 | 26 | 1.03 | 3.7 |
| Emulsion E | 1.7 | 10 | 0.46 | 15 | 0.56 | 5.5 |
| Emulsion F | 3.5 | 15 | 0.57 | 20 | 0.78 | 4.0 |
| Emulsion G | 8.8 | 25 | 0.61 | 23 | 0.77 | 4.4 |
| Emulsion H | 8.8 | 25 | 0.61 | 23 | 0.77 | 4.4 |
| Emulsion I | 8.9 | 18 | 0.84 | 26 | 1.03 | 3.7 |
| Emulsion J | 1.7 | 10 | 0.46 | 15 | 0.50 | 4.2 |
| Emulsion K | 8.8 | 18 | 0.64 | 23 | 0.85 | 5.2 |
| Emulsion L | 14.0 | 25 | 1.28 | 26 | 1.46 | 3.5 |
| Emulsion M | 1.0 | — | 0.07 | 15 | — | 1 |

In Table 4:

(A) Emulsions J to L were subjected to reduction sensitization at the grain preparation using thiourea dioxide and thiosulfonic acid according to the example of JP-A-2-191938;

(B) Emulsions A to I were subjected to gold sensitization, sulfur sensitization and selenium sensitization in the presence of the spectral sensitizing dyes described in each light-sensitive layer and sodium thiocyanate according to the example of JP-A-3-237450;

(C) in the preparation of tabular grains, low molecular weight gelatin was used according to the example of JP-A-1-158426;

(D) in tabular grains, dislocation lines were observed through a high-pressure electron microscope as described in JP-A-3-237450; and (E) Emulsion L was a double structured grain containing an internal high iodide core as described in JP-A-60-143331.

Preparation of Dispersion of Organic Solid Disperse Dye

ExF-2 shown below was dispersed in the following manner. Namely, 21.7 ml of water, 3 ml of a 5% aqueous solution of sodium p-octylphenoxyethoxyethoxyethanesulfonate and 0.5 g of a 5% aqueous solution of p-octylphenoxypolyoxyethylene ether (polymerization degree: 10) were poured in a 700 ml-volume pot mill, then thereto 5.0 g of Dye ExF-2 and 500 ml of zirconium oxide beads (diameter 1 mm) were added and the mixture was dispersed for 2 hours. The dispersion was conducted using a BO-type vibrating ball mill produced by Chuo Koki K.K. After the dispersion, the content was taken out and added to 8 g of a 12.5% aqueous gelatin solution and beads were removed by filtration to obtain a gelatin dispersion of the dye. The fine dye particle had a mean particle diameter of 0.44 μm.

In the same manner, solid dispersions of ExF-3, ExF-4 and ExF-6 were obtained. The fine dye particles had a mean particle diameter of 0.24 μm, 0.45 μm and 0.52 μm, respectively. ExF-5 was dispersed by the microprecipitation dispersion method described in Example 1 of European Patent Application (EP) No. 549,489A and the mean particle diameter thereof was 0.06 μm.

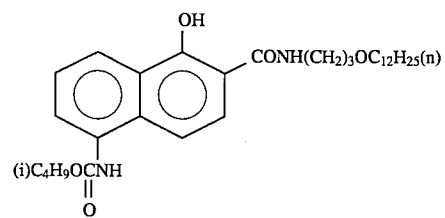

ExC-1

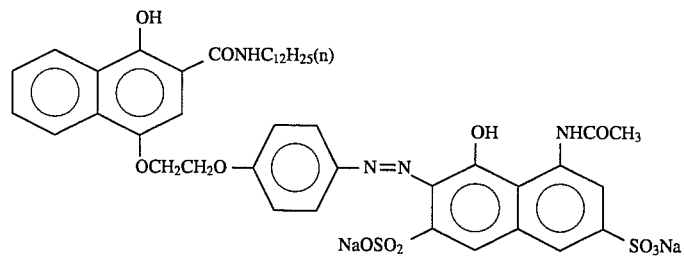

ExC-2

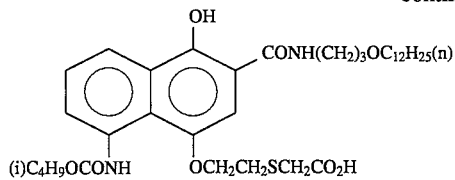 ExC-3
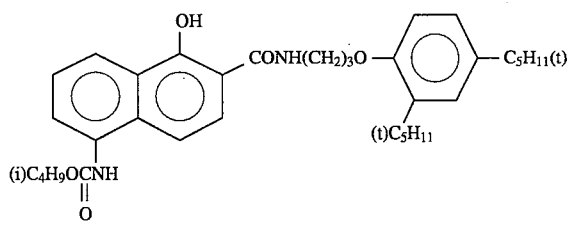 ExC-4
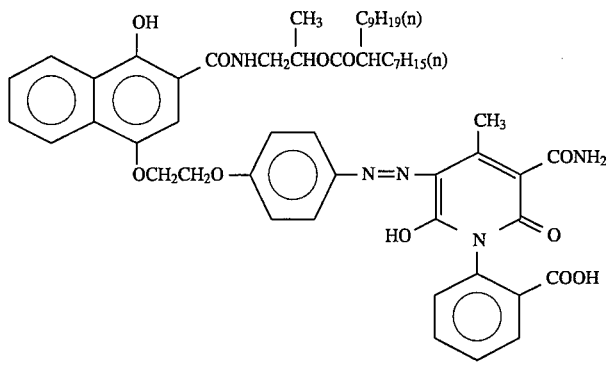 ExC-5
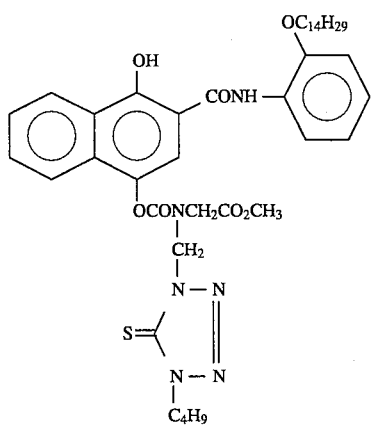 ExC-6
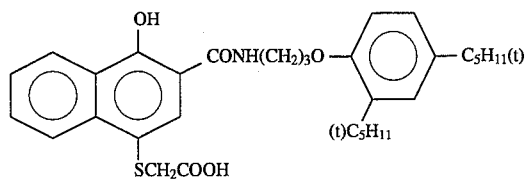 ExC-7

-continued
ExC-8
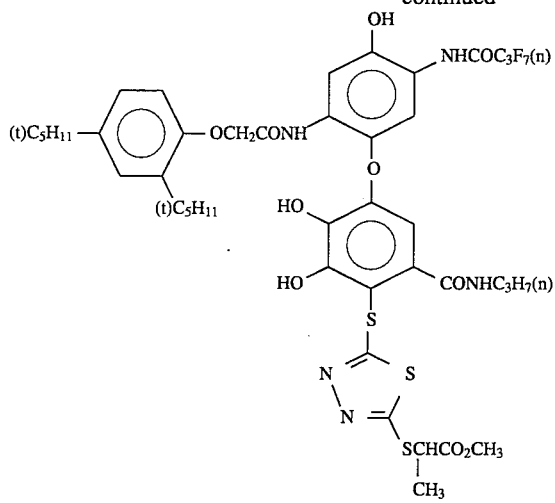
ExM-1
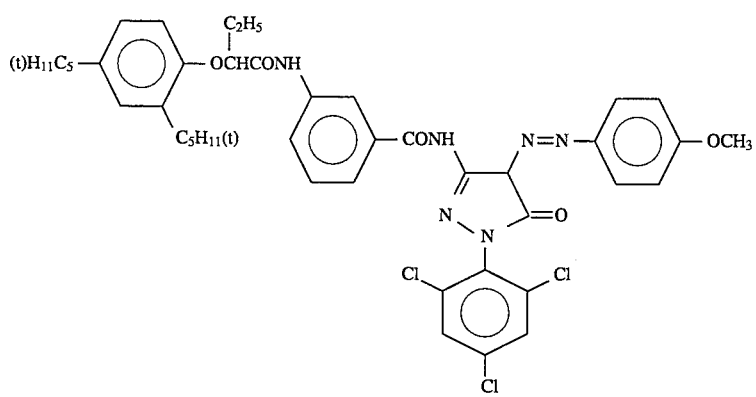
ExM-2
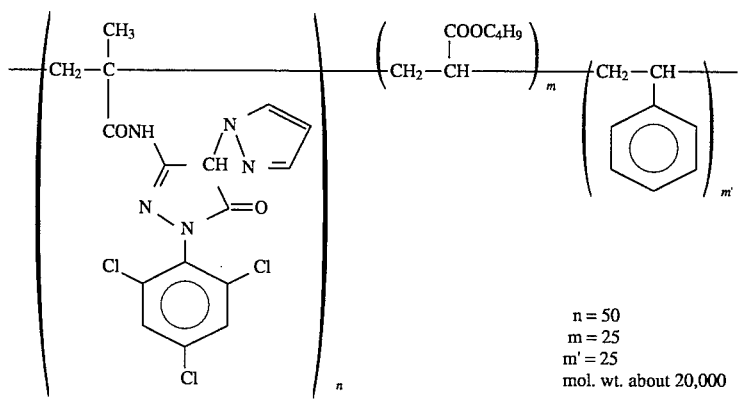
n = 50
m = 25
m' = 25
mol. wt. about 20,000
ExM-3
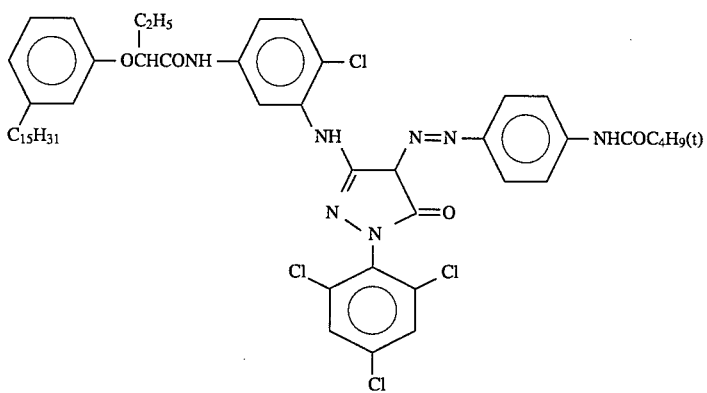

-continued
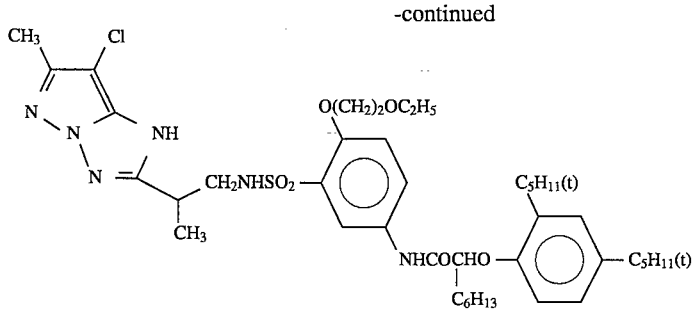
ExM-4
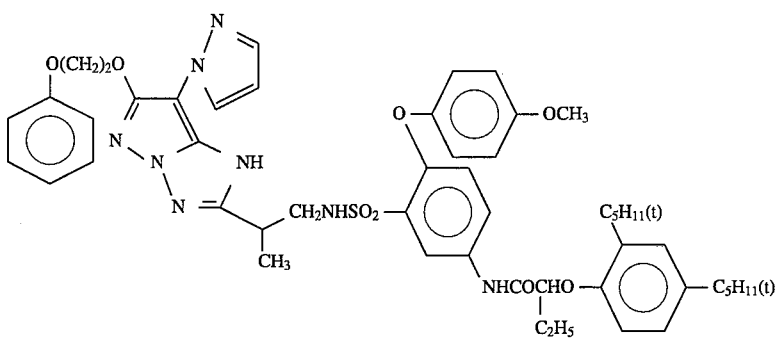
ExM-5
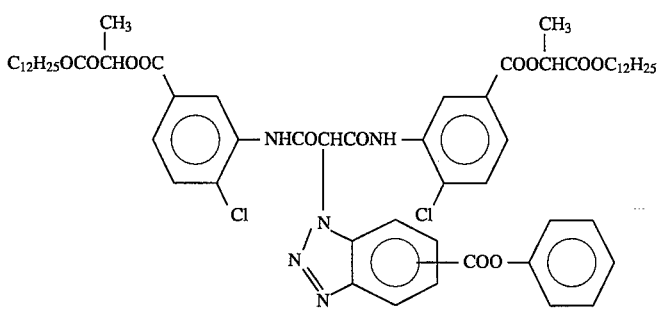
ExY-1
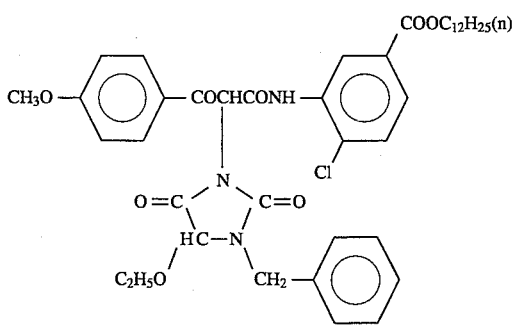
ExY-2
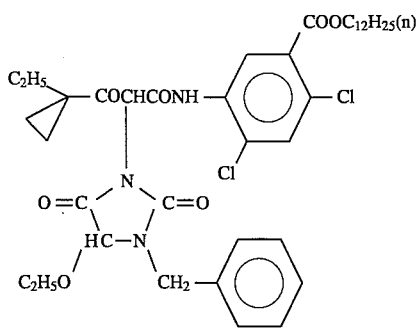
ExY-3

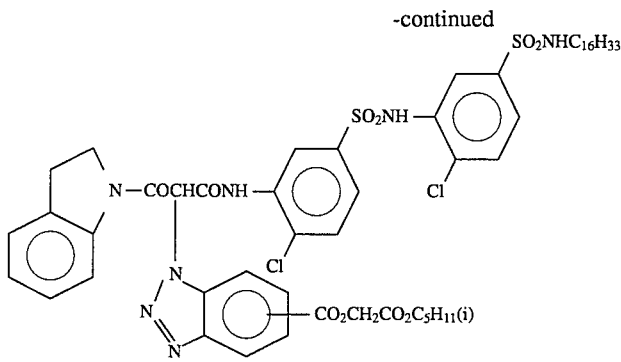
ExY-4
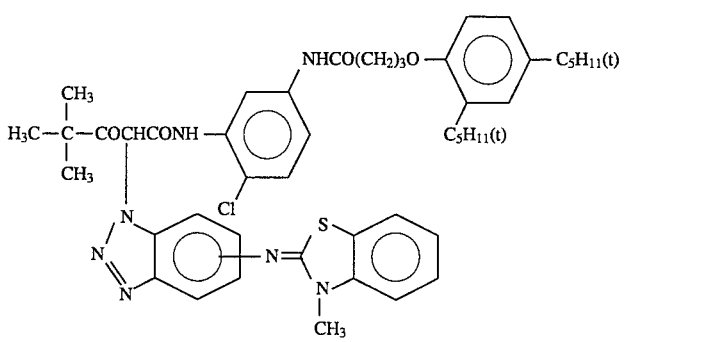
EXY-5
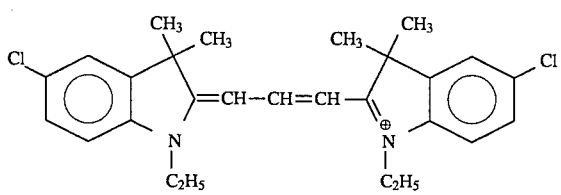
ExF-1
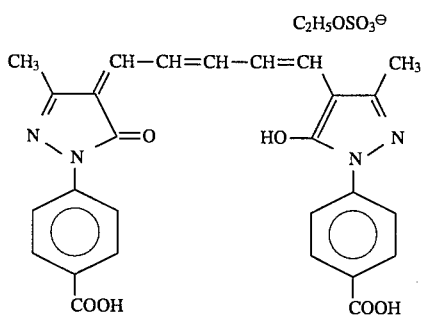
ExF-2
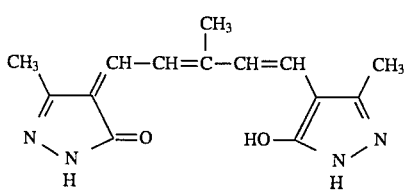
ExF-3
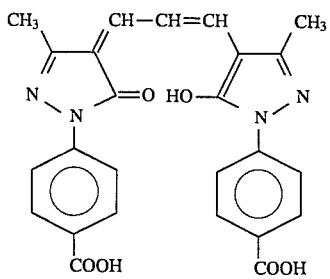
ExF-4

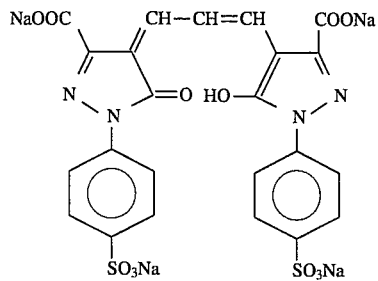  ExF-8
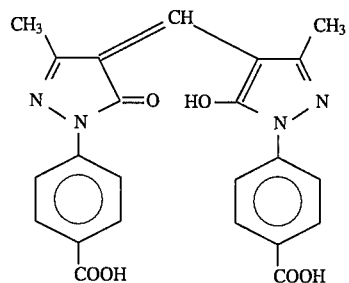  ExF-5
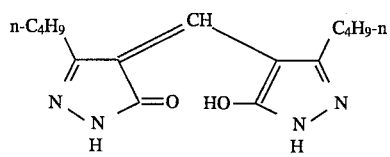  ExF-6
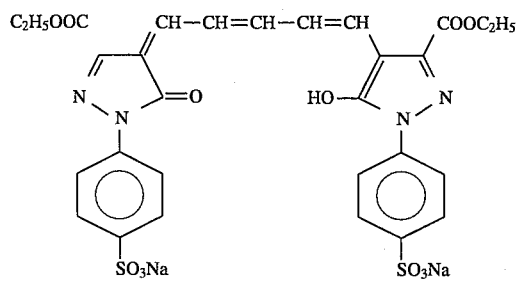  ExF-9
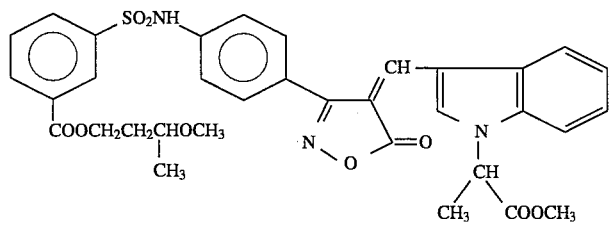  ExF-7
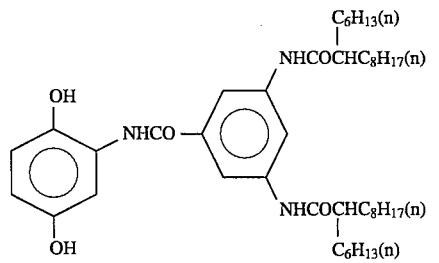  Cpd-1
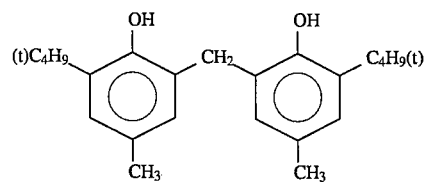  Cpd-2

-continued
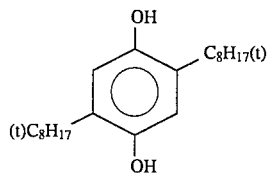 Cpd-3
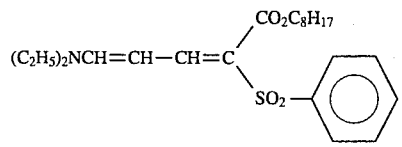 UV-1
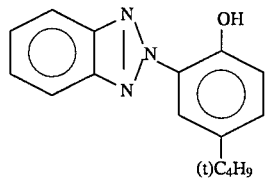 UV-2
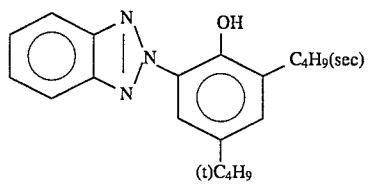 UV-3
Tricresyl phosphate HBS-1
Di-n-butyl phthalate HBS-2
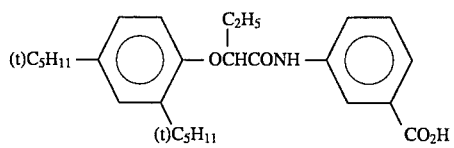 HBS-3
Tri(2-ethylhexyl) phosphate
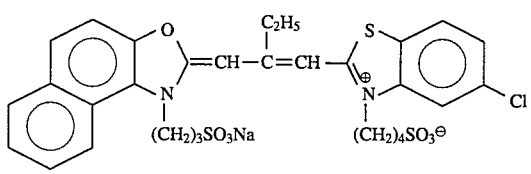 ExS-1
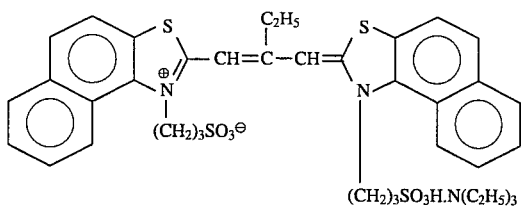 ExS-2
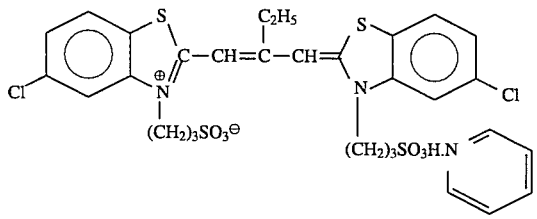 ExS-3

-continued
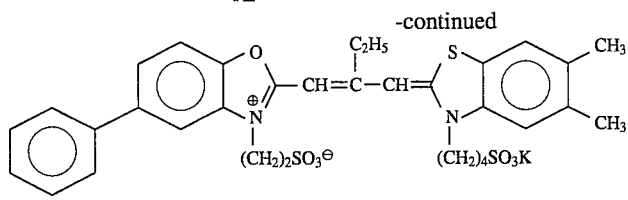 ExS-4
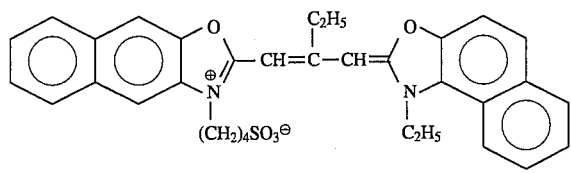 ExS-5
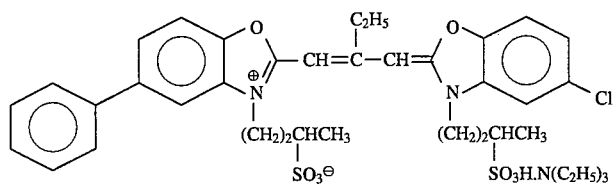 ExS-6
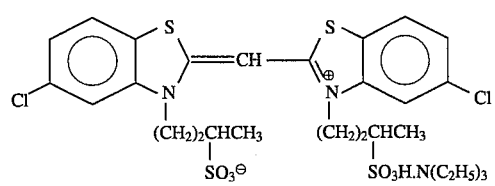 ExS-7
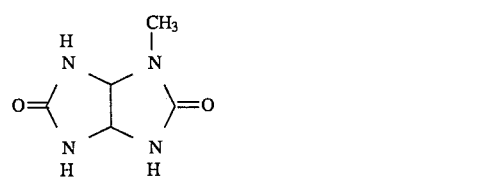 S-1
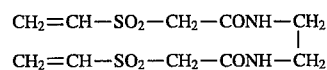 H-1
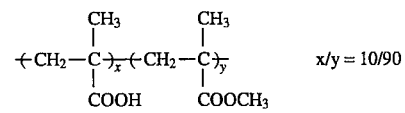 B-1
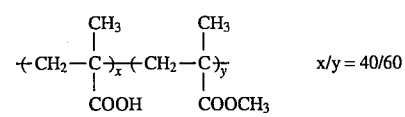 B-2
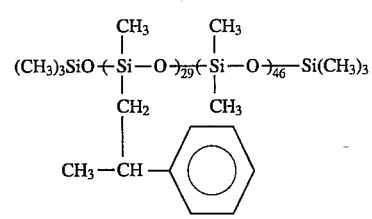 B-3
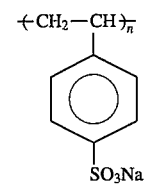 B-4

-continued
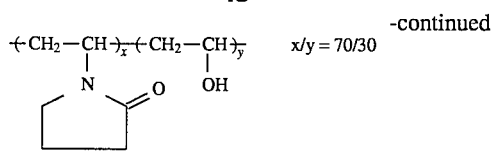 x/y = 70/30    B-5
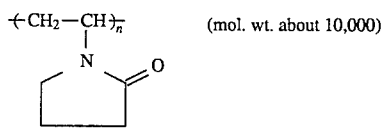 (mol. wt. about 10,000)    B-6
    W-1
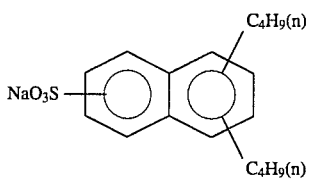 n = 2~4    W-2
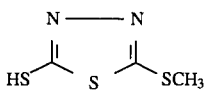    W-3
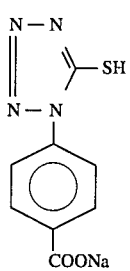    F-1
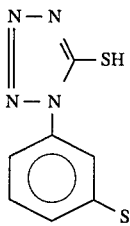    F-2
F-3
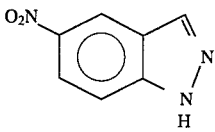    F-4
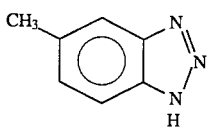    F-5
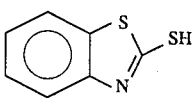    F-6

-continued
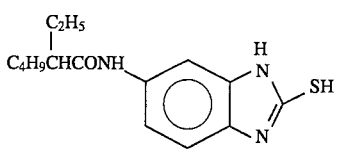   F-7
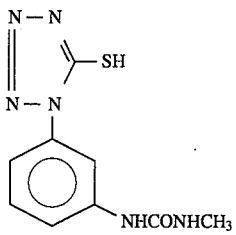   F-8
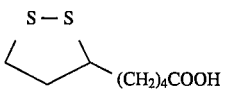   F-9
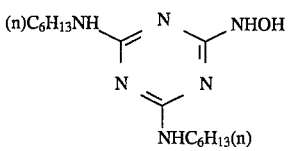   F-10
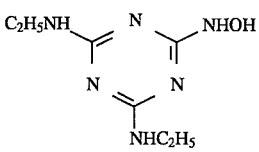   F-11
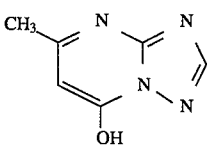   F-12
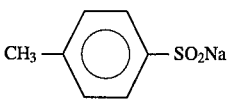   F-13
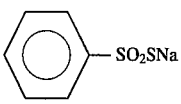   F-14
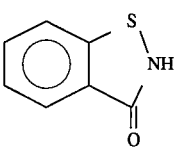   F-15
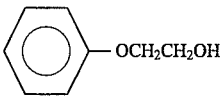   F-16
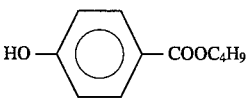   F-17
(11) Evaluation
(11-1) Creak Value
The creak value was measured immediately before heat treatment according to the above-described method.
(11-2) Height of Knurl
The height of knurl was measured immediately before heat treatment according to the above-described method.

(11-3) Resistance of Antistatic Layer (Electrically Conductive Layer)

The resistance of antistatic layer (electrically conductive layer) was measured immediately before heat treatment according to the above-described method.

(11-4) Haze

The haze of back surface was measured immediately after the coating of the antistatic layer according to the method of JP-A-1-24446.

The level causing no problem in practice is less than 3%.

(11-5) Difference in Roll Diameter

The difference in roll diameter was measured immediately before heat treatment according to the above-described method.

(11-6) Thickness of Air Layer

The thickness of air layer was measured immediately before heat treatment according to the above-described method.

(11-7) Slippage in Winding During Handling

The roll before heat treatment was subjected to model evaluation on the slippage in winding in the following manner.

The roll was placed on a carriage and the carriage was driven at a speed of 10 km/hr to collide perpendicularly against a concrete wall lined with 10 mm-thick rubber. The slippage generated at the roll edges (difference between the most projected portion and the most recessed portion) was measured. The slippage of less than 10 mm was rated as o, from 10 mm to less than 30 mm Δ, and 30 mm or more x. Allowable are Δ and o.

(11-8) Planeness After Heat Treatment

The supports after heat treatment were evaluated from the following viewpoints.

Self-adhesion (blocking):

The self-adhesion was visually evaluated while sending out the heat treated roll. The self-adhesion was evaluated as "strong" when breakage was generated accompanying blocking and as "weak" when self-adhesion was observed but not caused breakage, and the number of occurrences was counted. Or, the degree of self-adhesion was expressed by o, Δ or x. (Samples which suffered from self-adhesion even at one place were rated as x; samples which underwent weak self-adhesion were rated as Δ; and samples which were utterly free of blocking were rated as o.)

Planeness:

The trouble length (places having wrinkles or irregularities which could be visually observed) was set forth. Or, the degree of occurrence was expressed by o, Δ or x (samples having a trouble length of less than 100 m was rated as o; samples having a trouble length of from 100 to 200 m was rated as Δ; and samples having a trouble length of 200 m or more was rated as x).

Slippage in winding:

The difference between the most projected portion and the most recessed portion at the roll edges was measured. Or, the degree of slippage in winding was expressed by o, Δ or x (samples having the difference of less than 15 mm was rated as o; samples having the difference of from 15 to 25 mm was rated as Δ; and samples having the difference of 25 mm or more was rated as x).

In the above evaluation, the marks Δ and o lie on the practically allowable level.

(11-9) Adhesion Between Light-Sensitive Layer and Support

After coating light-sensitive layers, the photographic material was allowed to stand for 10 days at 25° C. and 60% RH to harden the light-sensitive layers and then the adhesion between the light-sensitive layer and the support was evaluated according to the following method.

(A) Evaluation of Adhesion in Dry Condition (1) Six slits were made on the surface of a sample by a razor at a distance of 5 mm in length and breadth.

(2) A pressure sensitive adhesive tape (Nitto-Tape, produced by Nitto Denki Kogyo K.K.) was affixed thereto and promptly peeled off at an angle of 180°.

(3) The adhesive property was visually evaluated:

o: peeled area accounted for less than 1%;

⊙: peeled area accounted for from 1 to 3%;

Δ: peeled area accounted for from 3 to 5%; and x: peeled area accounted for 10% or more.

(o, ⊙ and Δ lie on a level free of troubles in practice.)

(B) Evaluation on Adhesion in Wet Condition (1) A mark x was scratched by an iron pencil on the surface of a sample in a solution during each processing step of color development, fixing or stabilization.

(2) The sample was strongly rubbed five times by a finger tip capped with a rubber sack.

(3) The adhesive property was visually evaluated:

o: peeled length was less than 0.5 mm;

⊙: peeled length was from 0.5 to 1 mm;

Δ: peeled length was from 1 to 2 mm; and x: peeled length was 2 mm or more.

(o, ⊙ and Δ lie on a level free of troubles in practice.)

(11-10) Curling Habit/Mini-Lab Passing Property

Similarly, each sample after film hardening was evaluated according to the following procedure.

(1) Core Set

Sample film: 35 mm in width, 1.2 m in length

Moisture conditioning: each sample was left one night at 25° C. and 60% RH

Core set: each sample was wound round a spool having a diameter of 6 mm with the light-sensitive layer facing inwardly, then placed in a closed container and heated at 80° C. for 2 hours (conditions imaging a film left in an automobile in summer season).

Release to cooling: each sample was left one night in a room at 25° C.

(2) Determination of Curling Habit/Evaluation on Mini-Lab Passing Property

(a) Evaluation of Curling Habit Before Development

Each sample released to cooling was taken out from the closed container and immediately the core set was liberated. Right after this, the curling of the innermost circumference of the film was determined.

(b) Evaluation of Mini-Lab Passing Property

A film having a strong curling habit most frequently causes troubles during development in mini-lab. Accordingly, the following evaluation was conducted.

After determining the curling habit before development, each sample was immediately developed in a mini-lab developing machine (Mini-Lab FP-550B using CN-16Q as the processing solution, manufactured by Fuji Photo Film Co., Ltd.). The mini-lab processing was conducted according to a usual method with the one end of the exterior of the winding being fixed to the leader.

Each of sample films after mini-lab processing was visually evaluated by taking notice of the following viewpoints.

Folding: Samples having a strong curl failed to pass through nip rollers for driving in the mini-lab and were crushed. As a result, the other end opposite to the leader was folded. When even one "folding" was generated, the rating was "NG" and when "folding" was not generated at all, the rating was "OK".

Unevenness: Samples having a strong curl passed through the mini-lab in the tightly wound state and accordingly, the developer could not be supplied there sufficiently. As a result, "unevenness" in development was generated. This was visually evaluated and those where even slight unevenness was observed by the naked eye were rated as "NG" and those where unevenness was not observed at all were rated as "OK".

(c) Evaluation of Curling Habit After Development

After development in the mini-lab, curling of the innermost circumference of the film was immediately determined according to the above-described method.

(12) Results

(12-1) Glow Discharge Treatment

The results obtained are shown in Table 1.

(a) Creak Value

In levels 1-1 to 1-3, the strength of glow discharge treatment was changed to vary the creak value and in levels 1-8 to 1-12, the coating amount of the electrically conductive layer was changed to vary the creak value. When the creak value was within the range of the present invention (from 10 g to 600 g), the support after heat treatment could have good planeness (in view of self-adhesion and planeness) and roll form (in view of slippage in winding). On the other hand, level 1-13 having a creak value outside the range of the present invention showed bad planeness and also underwent occurrence of self-adhesion.

(b) Antistatic Layer (Creak-Preventing Layer)

As seen in levels 1-8 to 1-12, those to which electrically conductive fine particles were coated in an increased amount to lower the resistance were favored with the reduction in creak value and good planeness after heat treatment. However, if the addition amount was excessively increased and the power of volume resistance fell below 3, the haze was disadvantageously increased. Also, level 1-14 where spherical silica particles having no electrically conductivity were added in place of electrically conductive fine particles, level 1-15 where alumina particles were added in place of electrically conductive fine particles, and level 1-16 where calcium carbonate particles were added in place of electrically conductive fine particles underwent slight reduction in the planeness after heat treatment.

(c) Difference in Roll Diameter

Level 1-22 had a horizontal difference in roll diameter resulting from the changing of temperature between the left and the right by 25° C. on knurling (left edge: 150° C.; right edge: 125° C.). Due to the loss in balance between left and right knurls, the difference in roll diameter was large and this level underwent worsening in the planeness and the like after heat treatment and occurrence of self-adhesion. On the other hand, level 1-21 which was knurled with the difference in temperature between both edges of 5° C. or less showed good results.

(d) Height of Knurls

Levels 1-4 to 1-7 differed in the height of knurls. When the height was 1 μm or less, the air layer was thin and blocking after heat treatment was readily caused. Also, when the height was 50 μm or more, the thickness of the air layer became 10% or more and slippage in winding was readily caused during heat treatment.

(e) Winding Tension

In levels 1-18 to 1-20, the rolls were taken up by varying the winding tension. When the winding was done at a tension of from 4 to 75 kg/m, the support could have further good planeness. When the tension exceeded this range, the planeness after heat treatment was readily reduced. Also, when the tension was lower than this range, the thickness of air layer as well as the difference in roll diameter became large and the planeness was readily reduced.

(f) Procedure of Heat Treatment

Levels 1-24 and 1-25 were subjected to surface treatment after heat treatment. In level 1-25, the surface treatment strength was made weak but effect on insusceptibility to curling habit was diminished and the back end was weakly folded on development in mini lab. On the other hand, in level 1-24, the surface treatment strength was further reduced and as a result, the adhesion between the support and the light-sensitive layer could be hardly attained and the adhesion in dry and wet conditions lied at a level of Δ. Also, as seen in level 1-25, when the heat treatment was conducted after undercoating, the planeness after heat treatment was readily reduced. As such, it is preferred to conduct heat treatment between the surface treatment and the undercoating.

51

(g) Supports Other Than PEN

When the present invention was applied, other than PEN, to copolymers or polymer blends (levels 1-27 to 1-29) having a naphthalenedicarboxylic acid residue, they showed good performance with respect to planeness after heat treatment and the like.

(12-2) Flame Treatment

The results obtained are shown in Table 2. The results were similar to those in glow discharge treatment.

(12-3) UV Treatment

The results obtained are shown in Table 3. The results were similar to those in glow discharge treatment.

52

EXAMPLE 2

(1) Preparation of Support

Supports were prepared in the same manner as in Example 1.

(2) Surface Treatment of Support

PEN, copolymer pair/polymer blend and PET supports were subjected to glow discharge treatment in the same manner as in Example 1 according to the proceedings shown in Table 5.

TABLE 5

| Level | Support | Tg (°C.) | Surface Treatment | Electrically conductive Layer | Heat Treatment | Under-coating | Form | Strength (kV · min/m²) | Power of Electrically Conductive Layer | Height of Knurl (μm) | Creak Value (g) | Haze (%) |
|---|---|---|---|---|---|---|---|---|---|---|---|---|
| 4-1 | PEN | 119 | 1 | 2 | 3 | 4 | glow | 0.50 | 7.5 | 20 | 180 | 1.1 |
| 4-2 | " | " | " | " | " | " | " | 0.65 | " | " | 580 | " |
| 4-3 | " | " | " | " | " | " | " | 0.75 | " | " | 610 | " |
| 4-4 | " | " | " | " | " | " | " | 0.30 | " | " | 18 | " |
| 4-5 | " | " | " | " | " | " | " | 0.20 | " | " | 9 | " |
| 4-6 | " | " | " | " | " | " | " | 0.65 | " | 1.2 | 580 | " |
| 4-7 | " | " | " | " | " | " | " | " | " | 0.8 | 580 | " |
| 4-8 | " | " | " | " | " | " | " | 0.30 | " | 95 | 18 | " |
| 4-9 | " | " | " | " | " | " | " | " | " | 105 | 18 | " |
| 4-10 | " | " | " | " | " | " | " | 0.50 | 3.1 | 20 | 12 | 3.1 |
| 4-11 | " | " | " | " | " | " | " | " | 2.8 | " | 12 | 2.9 |
| 4-12 | " | " | " | " | " | " | " | " | 11.5 | " | 270 | 0.9 |
| 4-13 | " | " | " | " | " | " | " | " | 12.2 | " | " | 0.9 |
| 4-14 | " | " | " | " | " | " | " | " | 7.5 | " | " | 1.1 |
| 4-15 | " | " | " | " | " | " | " | " | " | " | " | " |
| 4-16 | " | " | " | " | " | " | " | " | " | " | " | 1.1 |
| 4-17 | " | " | " | " | " | " | " | " | " | " | " | " |
| 4-18 | " | " | 1 | 3 | 2 | 4 | " | 0.30 | 7.5 | 20 | 180 | 1.1 |
| 4-19 | " | " | 2 | 3 | 1 | 4 | " | 0.20 | " | " | 180 | 1.1 |
| 4-20 | " | " | " | " | " | " | " | 0.30 | " | " | 180 | " |
| 4-21 | " | " | 1 | 3 | 4 | 2 | " | 0.20 | " | " | 450 | " |
| 4-22 | P-3 | 102 | 1 | 2 | 3 | 4 | glow | 0.50 | 7.5 | 20 | 180 | 1.1 |
| 4-23 | P-12 | 95 | " | " | " | " | " | " | " | " | 170 | 1.3 |
| 4-24 | P-14 | 142 | " | " | " | " | " | " | " | " | 180 | 1.5 |
| 4-25 | PET | 70 | 1 | 2 | 3 | 4 | glow | " | 7.5 | " | 170 | 0.9 |

| Level | Winding Tension Initial Tension (kg/m) | Winding Tension Final Tension (kg/m) | After Heat Treatment Blocking | After Heat Treatment Planeness | Slippage in Winding | Adhesive Property In Dry Condition | Adhesive Property In Wet Condition | Curling Habit Before Development (m-1) | Curling Habit After Development (m-1) | Mini-Lab Aptitude Folding | Mini-Lab Aptitude Unevenness | Remarks |
|---|---|---|---|---|---|---|---|---|---|---|---|---|
| 4-1 | 20 | 15 | ○ | ○ | ○ | ○ | ○ | 131 | 60 | OK | OK | Invention |
| 4-2 | " | " | Δ | Δ | ○ | ⊚ | ⊚ | 131 | 59 | OK | OK | Invention |
| 4-3 | " | " | X | X | ○ | ⊚ | ⊚ | 133 | 61 | OK | OK | Comparison |
| 4-4 | " | " | ○ | ⊚ | ○ | Δ | Δ | 132 | 60 | OK | OK | Invention |
| 4-5 | " | " | ○ | ⊚ | ○ | X | X | 134 | 59 | OK | OK | Comparison |
| 4-6 | " | " | Δ | Δ | ○ | ⊚ | ⊚ | 129 | 59 | OK | OK | Invention |
| 4-7 | " | " | X | X | ○ | ⊚ | ⊚ | — | — | — | OK | Comparison |
| 4-8 | " | " | ○ | ⊚ | Δ | ○ | ○ | 128 | 58 | OK | OK | Invention |
| 4-9 | " | " | ○ | ⊚ | X | ○ | ○ | 133 | 60 | OK | OK | Comparison |
| 4-10 | " | " | ○ | ⊚ | ○ | ○ | ○ | 129 | 61 | OK | OK | Invention |
| 4-11 | " | " | ○ | ⊚ | ○ | ○ | ○ | 127 | 58 | OK | OK | " |
| 4-12 | " | " | ○ | ○ | ○ | ○ | ○ | 130 | 61 | OK | OK | " |
| 4-13 | " | " | ○ | Δ | ○ | ○ | ○ | 131 | 61 | OK | OK | " |
| 4-14 | 4.5 | 3.5 | ○ | ○ | ○ | ○ | ○ | 126 | 57 | OK | OK | " |
| 4-15 | 3.5 | 2.5 | ○ | Δ | ○ | ○ | ○ | 129 | 58 | OK | OK | " |

TABLE 5-continued

| | | | | | | | | | | | | |
|---|---|---|---|---|---|---|---|---|---|---|---|---|
| 4-16 | 74 | 60 | o | o | o | o | o | 134 | 63 | OK | OK | " |
| 4-17 | 76 | 62 | o | Δ | o | o | o | 135 | 64 | OK | OK | " |
| 4-18 | 20 | 15 | o | o | o | o | o | 125 | 57 | OK | OK | " |
| 4-19 | 20 | 15 | o | o | o | X | X | — | — | — | OK | Comparison |
| 4-20 | " | " | o | o | o | o | o | 156 | 74 | NG | OK | " |
| 4-21 | " | " | X | X | o | — | — | — | — | — | — | " |
| 4-22 | 20 | 15 | o | o | o | o | o | 131 | 63 | OK | OK | Invention |
| 4-23 | " | " | o | o | o | o | o | 135 | 64 | OK | OK | " |
| 4-24 | " | " | o | o | o | o | o | 120 | 50 | OK | OK | " |
| 4-25 | " | " | o | o | o | o | o | 230 | 221 | NG | NG | Comparison |

(3) Coating of Back First and Second Layers (Electrically Conductive Layers)

Coating was done on PEN, copolymer pair/polymer blend or PET support in the same manner as in Example 1.

(4) Knurling

Knurling was done on PEN, copolymer pair/polymer blend or PET support in the same manner as in Example 1.

(5) Heat Treatment of Support

Each support was heated by bringing it into contact with a heat roller at 5° C. higher than the Tg (Tg+5° C.) of each support for 2 seconds and then wound around a core in a take-up chamber kept at 5° C. lower than the Tg (Tg−5° C.) of each support under the following conditions.

- Core: aluminum-made hollow core having a diameter of 300 mm and a length of 1,500 mm
- Support: 1,200 mm in width and 2,000 m in length
- Winding tension: as described in Table 5

Each of rolled supports kept at 5° C. lower than the Tg (Tg−5° C.) was placed in a thermostat and subjected to heat treatment under the following conditions. The support was wound round the core in all cases with the back layer-coated surface facing inwardly.

- Temperature in thermostat: 5° C. lower than the Tg of each support for each level
- Time: stored at 5° C. lower than Tg for one day and cooled to room temperature for 3 days

(6) Coating of Undercoat Layer (on Emulsion-Layer Side)

An undercoat layer was coated on each support according to the method described in item (7-1) of Example 1.

(7) Coating of Back Third and Fourth Layers (Slide Layers)

The back layers were coated on each support according to the method in Example 1.

(8) Coating of Light-Sensitive Layers

The light-sensitive layers were coated on all of the supports in the same manner as in Example 1.

(9) Evaluation

Evaluations were made on creak value, haze, adhesive property, planeness, curling habit and mini-lab passing property in the same manner as in Example 1.

(10) Results

Similarly to the results in "glow discharge treatment" in Example 1, even when the heat treatment was conducted as in this example, by practicing the present invention, the resulting photographic material could have good planeness, adhesive property and mechanical strength and could be difficult to have a curling habit.

While the invention has been described in detail and with reference to specific embodiments thereof, it will be apparent to one skilled in the art that various changes and modifications can be made therein without departing from the spirit and scope thereof.

What is claimed is:

1. A method for heat treating a rolled polyester support at a temperature lower than the glass transition temperature (Tg) of said support, comprising the steps of winding a polyester film into a roll around a core at a winding tension of from 3 to 75 kg/m to form a wound polyester support having a difference in roll diameter of 10% or less; knurling said support on both edges to provide a knurl having a height of from 1 to 50 μm; and then heat treating said wound polyester support at a temperature of 94° to 119° C. to render the film surface smooth.

2. The heat treatment method of claim 1, wherein said polyester support has a creak value of from 10 to 600 g.

3. The heat treatment method of claim 1, further comprising the step of surface treating at least one surface of said polyester support before said heat treatment step.

4. The heat treatment method of claim 1, further comprising the steps of surface treating said polyester support and undercoating said polyester support, wherein said heat treatment step is conducted between said surface treatment and undercoating steps.

5. The heat treatment method of claim 1, further comprising the step of subjecting the surface of said polyester support to glow discharge treatment, ultraviolet treatment, flame treatment or corona discharge treatment.

6. The heat treatment method of claim 1, wherein said winding step forms an air layer having a thickness of from 1.5 to 10 μm between wound layers of the support and the wound support is then subjected to said heat treatment.

7. The heat treatment method of claim 1, further comprising the step of providing an electrically conductive layer having a resistance of from $10^3$ to $10^{22}$ Ω on at least one surface of said polyester support before said heat treatment step.

8. The heat treatment method of claim 7, wherein said electroconductive layer comprises fine particles of a metal oxide or a composite oxide of at least one element selected from the group consisting of Zn, Ti, Sn, Al, In, Si, Mg, Ba, Mo, or V, and has a volume resistivity of from 0 to $10^7$ Ω/cm.

9. The heat treatment method of claim 1, wherein said support is a photographic support and has a glass transition temperature of from 95° C. to 200° C.

10. The heat treatment method of claim 1, wherein said support is a photographic support and said heat treatment step is conducted at a temperature of from 50° C. to the glass transition temperature of said photographic support.

11. The heat treatment method of claim 1, wherein said support is a photographic support and has a thickness of from 80 to 115 µm.

12. The heat treatment method of claim 1, wherein said polyester is polyethylene naphthalate.

* * * * *